US012666061B2

(12) United States Patent
Kuo et al.

(10) Patent No.: US 12,666,061 B2
(45) Date of Patent: Jun. 23, 2026

(54) METHOD AND APPARATUS FOR CROSS-COMPONENT PREDICTION FOR VIDEO CODING

(71) Applicant: BEIJING DAJIA INTERNET INFORMATION TECHNOLOGY CO., LTD., Beijing (CN)

(72) Inventors: Che-Wei Kuo, Beijing (CN); Xiaoyu Xiu, San Diego, CA (US); Ning Yan, Hangzhou (CN); Hong-Jheng Jhu, Beijing (CN); Yi-Wen Chen, San Diego, CA (US); Wei Chen, San Diego, CA (US); Han Gao, Beijing (CN); Xianglin Wang, San Diego, CA (US); Bing Yu, Beijing (CN)

(73) Assignee: BEIJING DAJIA INTERNET INFORMATION TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/800,755

(22) Filed: Aug. 12, 2024

(65) Prior Publication Data

US 2025/0047873 A1 Feb. 6, 2025

Related U.S. Application Data

(63) Continuation of application No. PCT/US2023/012722, filed on Feb. 9, 2023.
(Continued)

(51) Int. Cl.
*H04N 19/00* (2014.01)
*H04N 19/132* (2014.01)
(Continued)

(52) U.S. Cl.
CPC ......... *H04N 19/186* (2014.11); *H04N 19/132* (2014.11); *H04N 19/136* (2014.11);
(Continued)

(58) Field of Classification Search
None
See application file for complete search history.

(56) References Cited

U.S. PATENT DOCUMENTS

2017/0364809 A1* 12/2017 Ramamurthi ........... G06F 17/18
2020/0145670 A1* 5/2020 Filippov .............. H04N 19/593
(Continued)

FOREIGN PATENT DOCUMENTS

WO WO 2021/115235 A1 6/2021

OTHER PUBLICATIONS

International Search Report and Written Opinion dated May 25, 2023, issued in counterpart International Application No. PCT/US2023/12722. (9 pages).
(Continued)

*Primary Examiner* — Zhihan Zhou
(74) *Attorney, Agent, or Firm* — Oblon, McClelland, Maier & Neustadt, L.L.P.

(57) ABSTRACT

A method for decoding video data. The method including obtaining, from a bitstream, a video block and region information, wherein the region information comprises an index indicating a region selected from a set of regions located external to the video block for deriving a multiple linear regression (MLR) model, obtaining luma and chroma sample values in the region based on the region information; deriving the MLR model using the luma and chroma sample values in the region, predicting each of the chroma sample values in the video block by applying the MLR model to
(Continued)

corresponding luma sample values for that chroma sample, and obtaining decoded video block using the predicted chroma sample values.

20 Claims, 22 Drawing Sheets

Related U.S. Application Data

(60) Provisional application No. 63/317,439, filed on Mar. 7, 2022, provisional application No. 63/308,757, filed on Feb. 10, 2022.

(51) Int. Cl.

| | |
|---|---|
| *H04N 19/136* | (2014.01) |
| *H04N 19/176* | (2014.01) |
| *H04N 19/184* | (2014.01) |
| *H04N 19/186* | (2014.01) |
| *H04N 19/44* | (2014.01) |
| *H04N 19/50* | (2014.01) |

(52) U.S. Cl.
CPC ......... *H04N 19/176* (2014.11); *H04N 19/184* (2014.11); *H04N 19/44* (2014.11); *H04N 19/50* (2014.11)

(56) References Cited

U.S. PATENT DOCUMENTS

| | | | | |
|---|---|---|---|---|
| 2020/0154115 | A1* | 5/2020 | Ramasubramonian | ...................... H04N 19/176 |
| 2020/0296425 | A1* | 9/2020 | Seregin | ................ H04N 19/174 |
| 2021/0152841 | A1* | 5/2021 | Hu | ......................... H04N 19/44 |
| 2021/0266594 | A1* | 8/2021 | Luo | ....................... H04N 19/159 |
| 2021/0281831 | A1* | 9/2021 | Alshin | ................... H04N 19/11 |
| 2022/0312020 | A1* | 9/2022 | Li | ......................... H04N 19/105 |

OTHER PUBLICATIONS

Hang (Qualcomm) K et al: "Enhanced Cross-component Linear Model Intra-prediction", 116. MPEG Meeting; Oct. 14, 2016-Oct. 21, 2016; Chengdu; (Motion Picture Expert Group ORISO/IEC JTC1/SC29/WG11),No. m39116, Oct. 6, 2016 (Oct. 6, 2016), XP030257232. (5 pages).

C-W Kuo (Kwai) et al: "AHG12: Enhanced CCLM", 26. JVET Meeting; Apr. 20, 2022 Apr. 29, 2022; Teleconference; (The Joint Video Exploration Team of ISO/IEC JTC1/SC29/WG11 AND ITU-T SG.16 ), No. JVET-Z0140 ; m59473, Apr. 25, 2022 (Apr. 25, 2022), XP030301030. (5 pages).

Ye (Alibaba-Inc) Y: "BoG report on EE2 related proposals", 26. JVET Meeting; Apr. 20, 2022-Apr. 29, 2022; Teleconference; (The Joint Video Exploration Team of ISO/IECJTC1/SC29/WG11 And ITU-T SG.16), No. JVET-ZO210; m59640, Apr. 27, 2022 (Apr. 27, 2022), XP030301157. (24 pages).

C-W Kuo (Kwai) et al.: "EE2-1.1b and 1.2: Filter-based linear model and gradient linear model", 27. JVET Meeting; Jul. 13, 2022—Jul. 22, 2022; Teleconference; (The Joint Video Exploration Team of ISO/IEC JTC1/SC29/WG11 and ITU-T SG.16 ),No. JVET-AA0125 ; m60101, Jul. 6, 2022 (Jul. 6, 2022), XP030302961. (4 pages).

Extended European Search report dated Jan. 29, 2026, issued in counterpart Ep Application No. 23753445.8, citing documents No. 1-5. (10 pages).

* cited by examiner

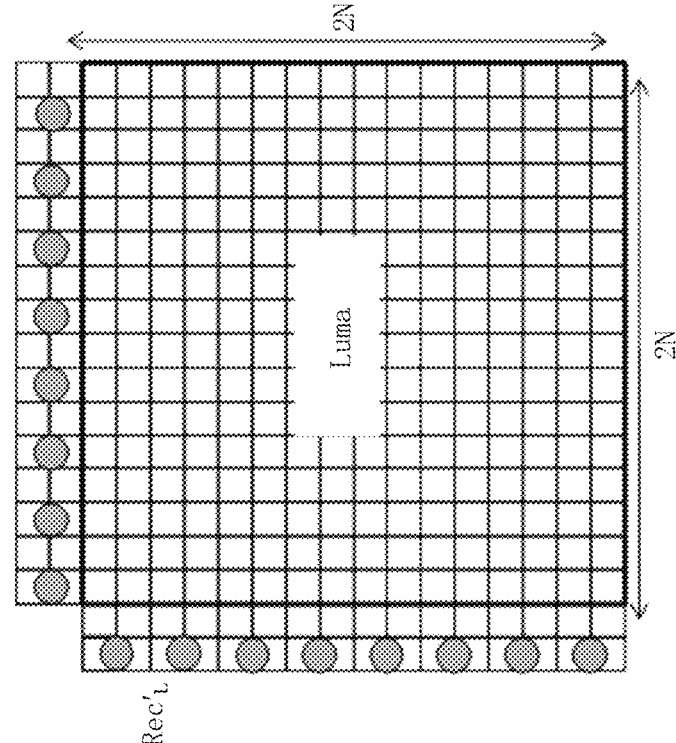
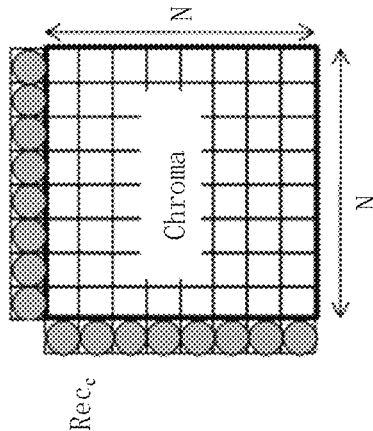
Fig. 4

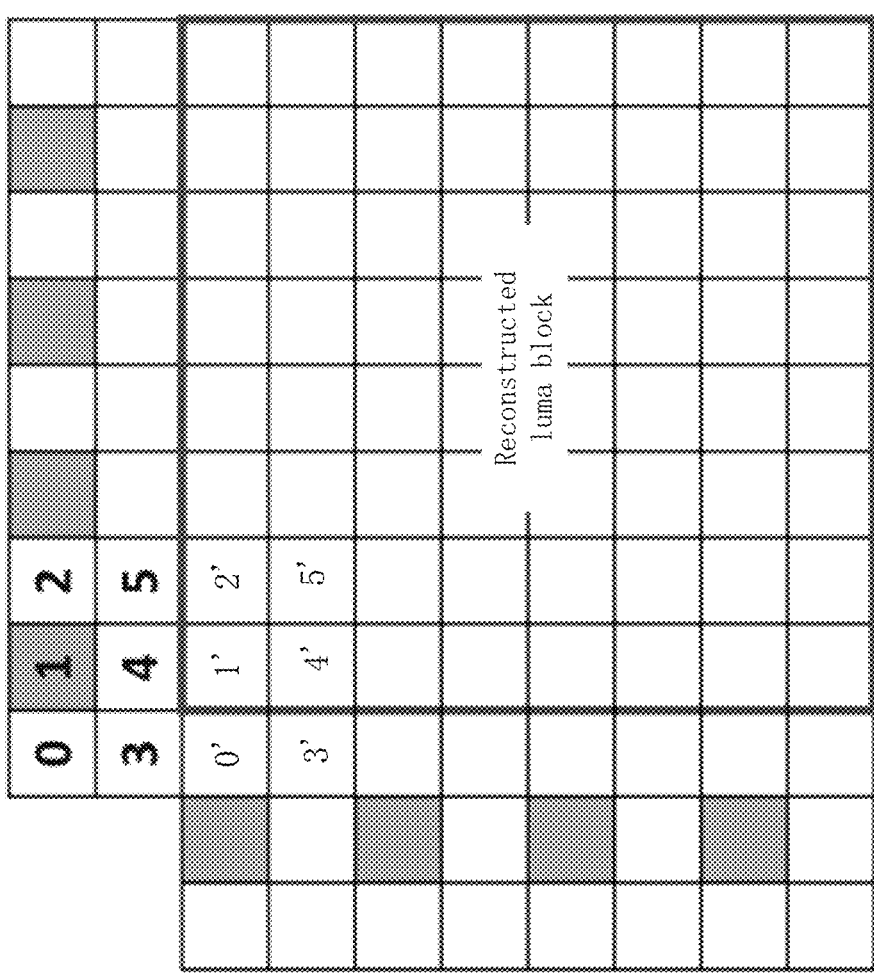
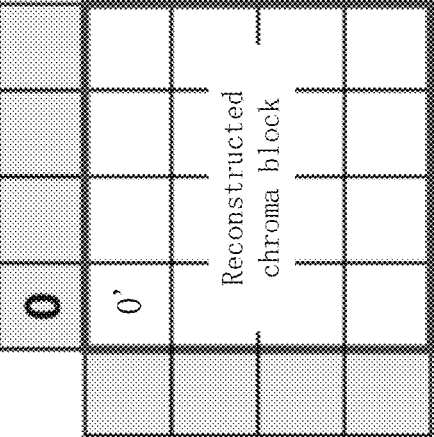
Fig. 10

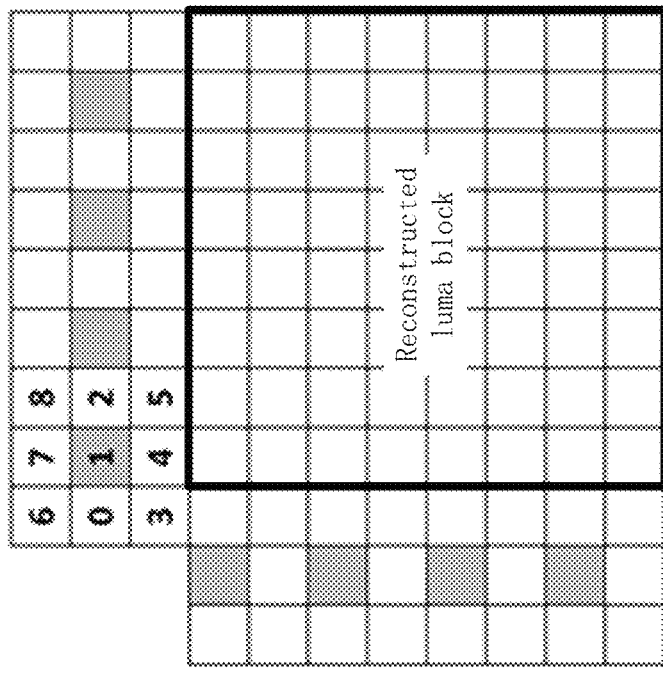
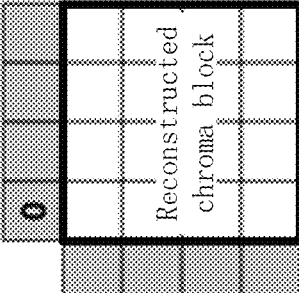
Fig. 11

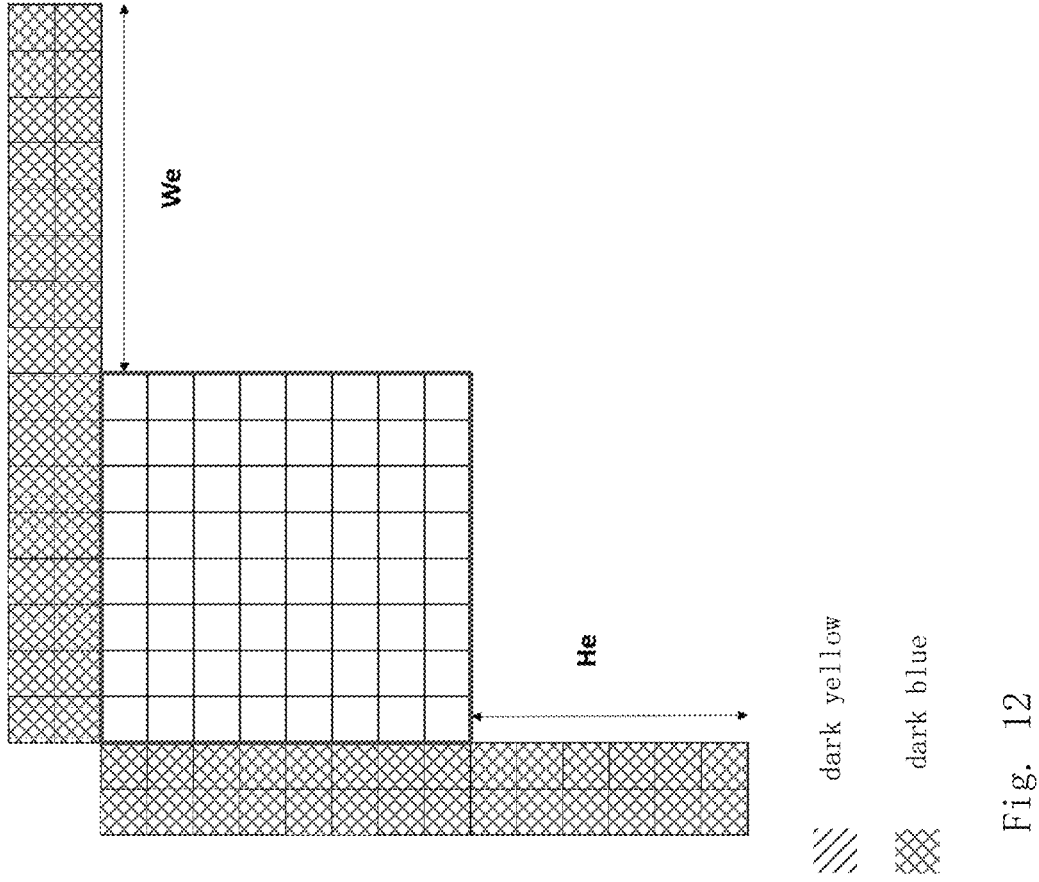
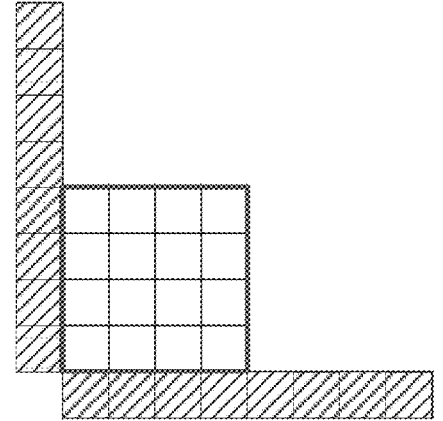
dark yellow
dark blue
Fig. 12

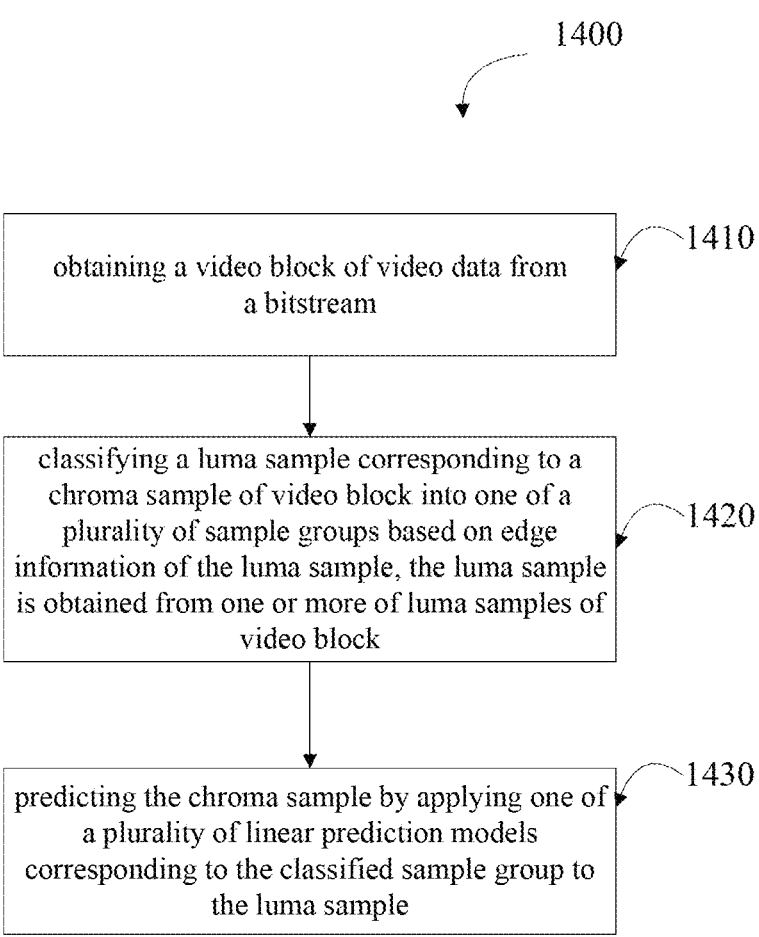

1400 obtaining a video block of video data from a bitstream —1410 classifying a luma sample corresponding to a chroma sample of video block into one of a plurality of sample groups based on edge information of the luma sample, the luma sample is obtained from one or more of luma samples of video block —1420 predicting the chroma sample by applying one of a plurality of linear prediction models corresponding to the classified sample group to the luma sample —1430

Fig. 14

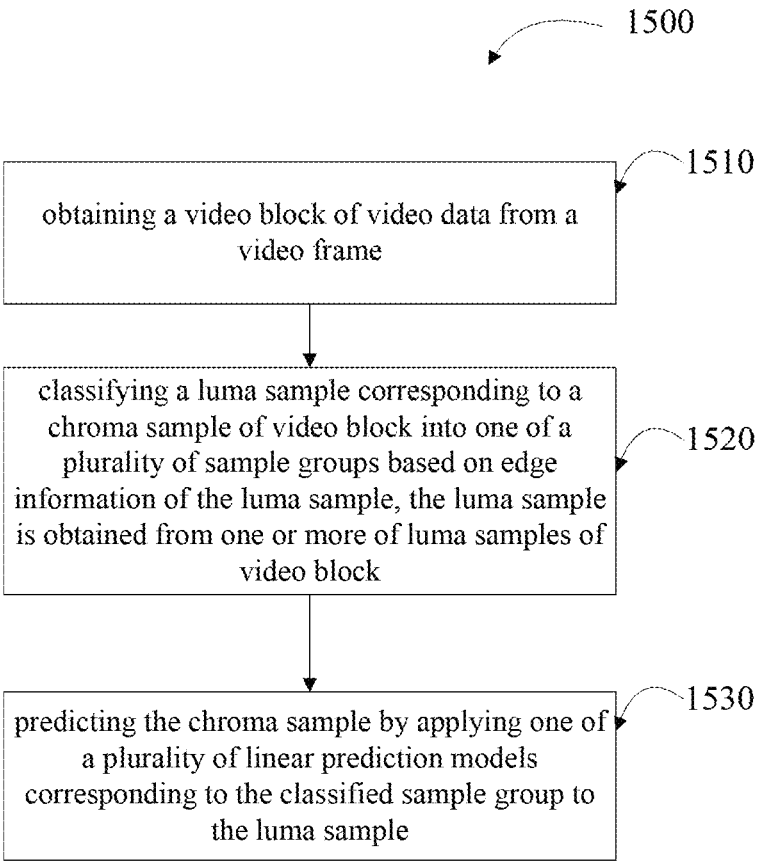

1500 obtaining a video block of video data from a video frame
1510 classifying a luma sample corresponding to a chroma sample of video block into one of a plurality of sample groups based on edge information of the luma sample, the luma sample is obtained from one or more of luma samples of video block
1520 predicting the chroma sample by applying one of a plurality of linear prediction models corresponding to the classified sample group to the luma sample
1530

Fig. 15

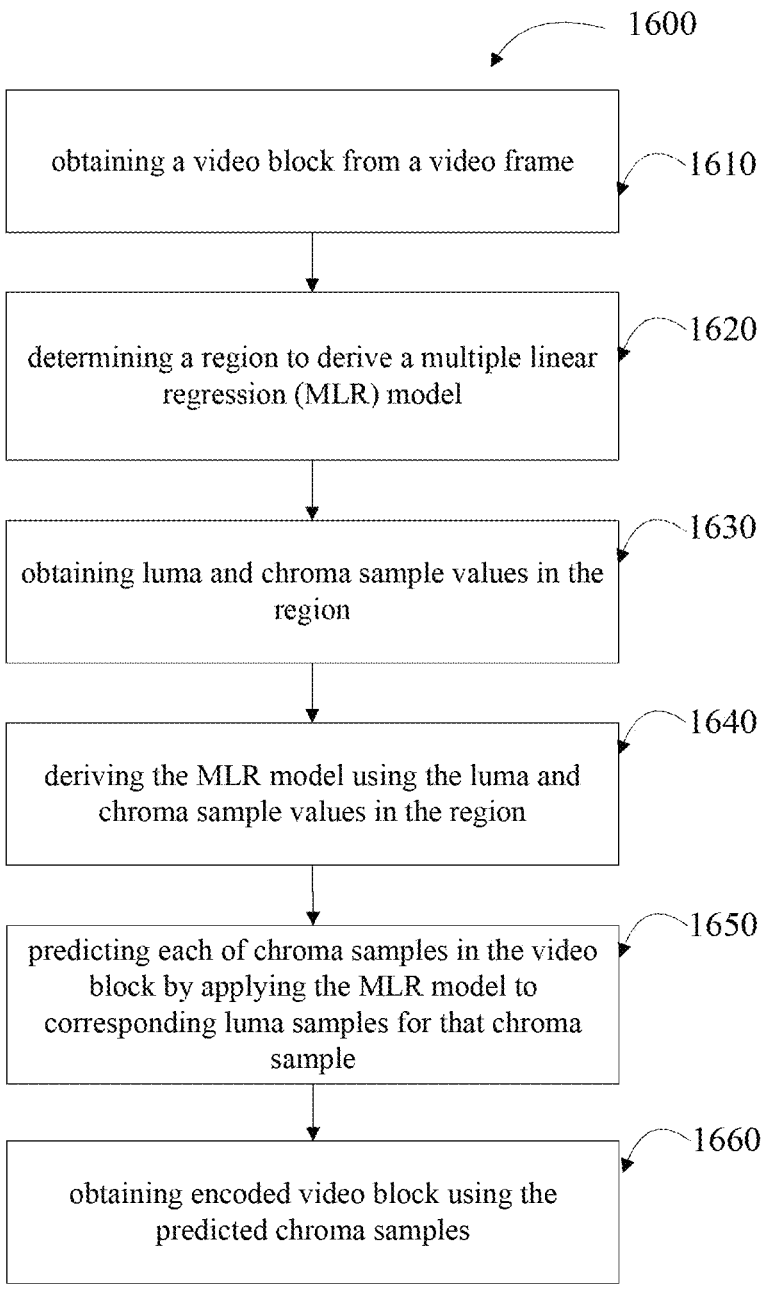

1600 obtaining a video block from a video frame — 1610 determining a region to derive a multiple linear regression (MLR) model — 1620 obtaining luma and chroma sample values in the region — 1630 deriving the MLR model using the luma and chroma sample values in the region — 1640 predicting each of chroma samples in the video block by applying the MLR model to corresponding luma samples for that chroma sample — 1650 obtaining encoded video block using the predicted chroma samples — 1660

Fig. 16

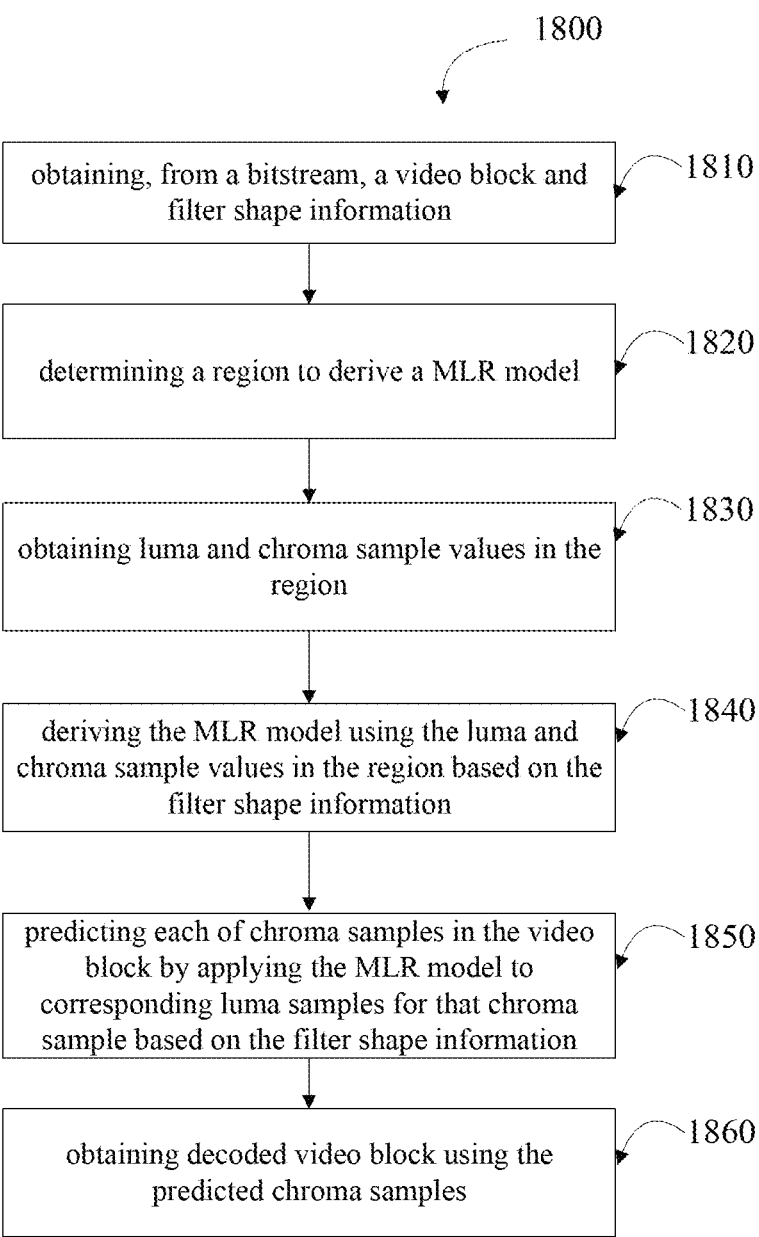

1800 obtaining, from a bitstream, a video block and filter shape information    ~1810 determining a region to derive a MLR model    ~1820 obtaining luma and chroma sample values in the region    ~1830 deriving the MLR model using the luma and chroma sample values in the region based on the filter shape information    ~1840 predicting each of chroma samples in the video block by applying the MLR model to corresponding luma samples for that chroma sample based on the filter shape information    ~1850 obtaining decoded video block using the predicted chroma samples    ~1860

Fig. 18

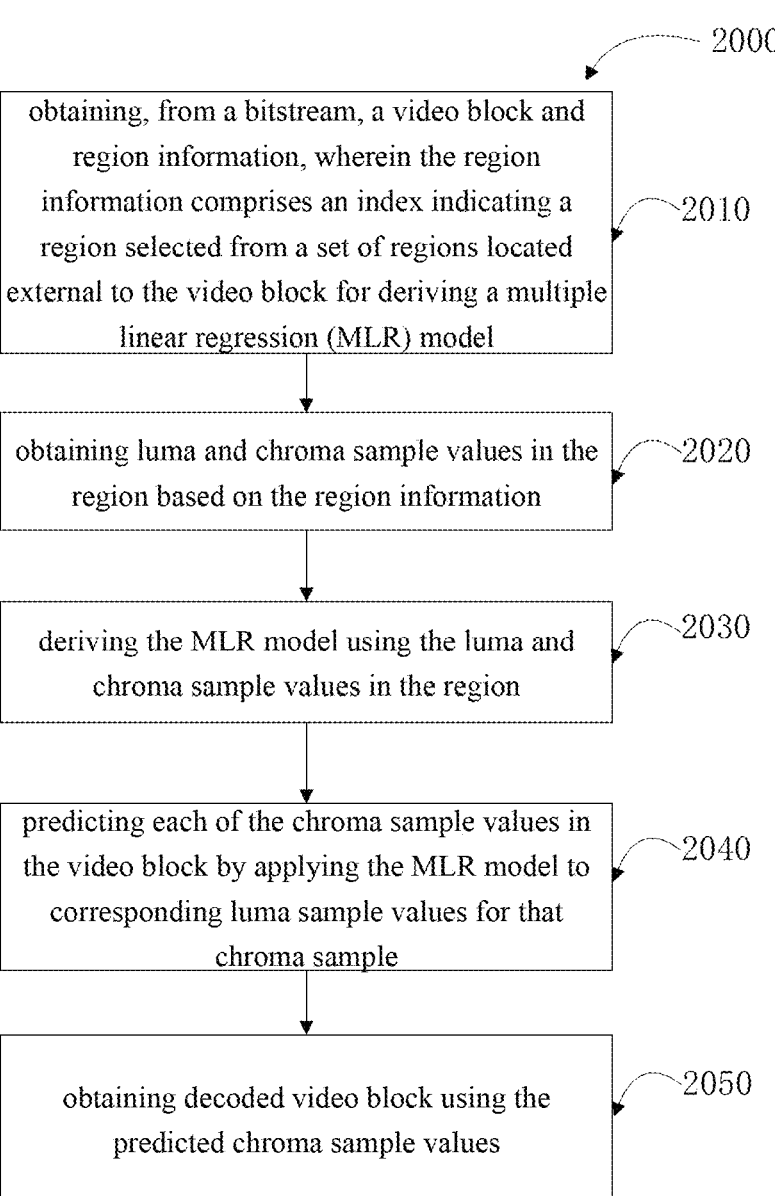

2000 obtaining, from a bitstream, a video block and region information, wherein the region information comprises an index indicating a region selected from a set of regions located external to the video block for deriving a multiple linear regression (MLR) model

2010 obtaining luma and chroma sample values in the region based on the region information

2020 deriving the MLR model using the luma and chroma sample values in the region

2030 predicting each of the chroma sample values in the video block by applying the MLR model to corresponding luma sample values for that chroma sample

2040 obtaining decoded video block using the predicted chroma sample values

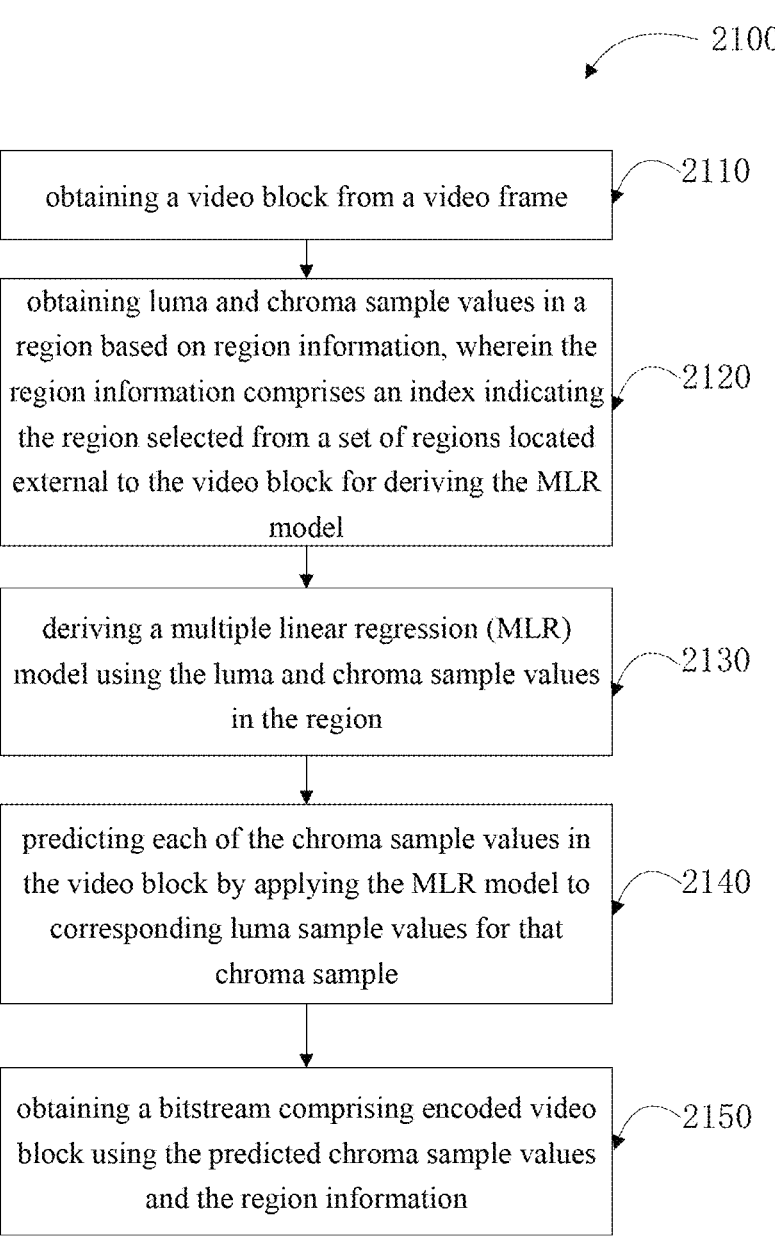

~ 2100 obtaining a video block from a video frame    2110 obtaining luma and chroma sample values in a region based on region information, wherein the region information comprises an index indicating the region selected from a set of regions located external to the video block for deriving the MLR model    2120 deriving a multiple linear regression (MLR) model using the luma and chroma sample values in the region    2130 predicting each of the chroma sample values in the video block by applying the MLR model to corresponding luma sample values for that chroma sample    2140 obtaining a bitstream comprising encoded video block using the predicted chroma sample values and the region information    2150

Fig. 21

METHOD AND APPARATUS FOR CROSS-COMPONENT PREDICTION FOR VIDEO CODING

CROSS-REFERENCE TO RELATED APPLICATION

The present application is a continuation application of PCT application No. PCT/US2023/012722 filed on Feb. 9, 2023, which is based upon and claims priority to Provisional Applications No. 63/308,757, filed on Feb. 10, 2022 and Provisional Applications No. 63/317,439, filed on Mar. 7, 2022. The disclosures of the above prior applications are incorporated herein by reference in their entirety for all purposes.

FIELD

Aspects of the present disclosure relate generally to video coding and compression, and more particularly, to methods and apparatus for cross-component prediction technology.

BACKGROUND

Various video coding techniques may be used to compress video data. Video coding is performed according to one or more video coding standards. For example, video coding standards include versatile video coding (VVC), high-efficiency video coding (H.265/HEVC), advanced video coding (H.264/AVC), moving picture expert group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality.

SUMMARY

The following presents a simplified summary of one or more aspects according to the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an embodiment, there provides a method for decoding video data, comprising: obtaining, from a bitstream, a video block and region information, wherein the region information comprises an index indicating a region selected from a set of regions located external to the video block for deriving a multiple linear regression (MLR) model; obtaining luma and chroma sample values in the region based on the region information; deriving the MLR model using the luma and chroma sample values in the region; predicting each of the chroma sample values in the video block by applying the MLR model to corresponding luma sample values for that chroma sample; and obtaining decoded video block using the predicted chroma sample values.

According to an embodiment, there provides a method for encoding video data, comprising: obtaining a video block from a video frame; obtaining luma and chroma sample values in a region based on region information, wherein the region information comprises an index indicating the region selected from a set of regions located external to the video block for deriving the MLR model; deriving a multiple linear regression (MLR) model using the luma and chroma sample values in the region; predicting each of the chroma sample values in the video block by applying the MLR model to corresponding luma sample values for that chroma sample; and obtaining a bitstream comprising encoded video block using the predicted chroma sample values and the region information.

According to an embodiment, there provides a computer system, comprising: one or more processors; and one or more storage devices storing computer-executable instructions that, when executed, cause the one or more processors to perform the operations of the method of the present disclosure.

According to an embodiment, there provides a computer program product, storing computer-executable instructions that, when executed, cause one or more processors to perform the operations of the method of the present disclosure.

According to an embodiment, there provides a computer readable medium, storing computer-executable instructions that, when executed, cause one or more processors to receive a bitstream and perform the operations of the method of the present disclosure.

According to an embodiment, there provides a computer readable medium, storing computer-executable instructions that, when executed, cause one or more processors to perform the operations of the method of the present disclosure and transmit a bitstream comprising encoded video information associated with the predicted chroma samples.

BRIEF DESCRIPTION OF THE DRAWINGS

The disclosed aspects will hereinafter be described in connection with the appended drawings that are provided to illustrate and not to limit the disclosed aspects.

FIG. 4 illustrates an example of the locations of the left and above samples and the sample of the current block involved in the CCLM mode.

FIG. 10 shows an example that 6-tap is used in multiple linear regression (MLR) model according to one or more aspects of the present disclosure.

FIG. 11 shows exemplary different filter shapes and/or numbers of taps according to one or more aspects of the present disclosure.

FIG. 12 shows an example in which FLM can only use top or left luma and/or chroma samples (extended) for parameter derivation.

FIG. 14 illustrates a workflow of a method for decoding video data according to one or more aspects of the present disclosure.

FIG. 15 illustrates a workflow of a method for encoding video data according to one or more aspects of the present disclosure.

FIG. 16 illustrates a workflow of a method for encoding video data according to one or more aspects of the present disclosure.

FIG. 18 illustrates a workflow of a method for decoding video data according to one or more aspects of the present disclosure.

FIG. 20 illustrates a workflow of a method for decoding video data according to one or more aspects of the present disclosure.

FIG. 21 illustrates a workflow of a method for encoding video data according to one or more aspects of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

It should be illustrated that the terms "first," "second," and the like used in the description, claims of the present disclosure, and the accompanying drawings are used to distinguish objects, and not used to describe any specific order or sequence. It should be understood that the data used in this way may be interchanged under an appropriate condition, such that the embodiments of the present disclosure described herein may be implemented in orders besides those shown in the accompanying drawings or described in the present disclosure.

The first version of the VVC standard was finalized in July 2020, which offers approximately 50% bit-rate saving or equivalent perceptual quality compared to the prior generation video coding standard HEVC. Although the VVC standard provides significant coding improvements than its predecessor, there is evidence that superior coding efficiency can be achieved with additional coding tools. Recently, Joint Video Exploration Team (JVET) under the collaboration of ITU-T VCEG and ISO/IEC MPEG started the exploration of advanced technologies that can enable substantial enhancement of coding efficiency over VVC. In April 2021, one software codebase, called Enhanced Compression Model (ECM) was established for future video coding exploration work. The ECM reference software was based on VVC Test Model (VTM) that was developed by JVET for the VVC, with several existing modules (e.g., intra/inter prediction, transform, in-loop filter and so forth) are further extended and/or improved. In future, any new coding tool beyond the VVC standard need to be integrated into the ECM platform, and tested using JVET common test conditions (CTCs).

Figure 1:
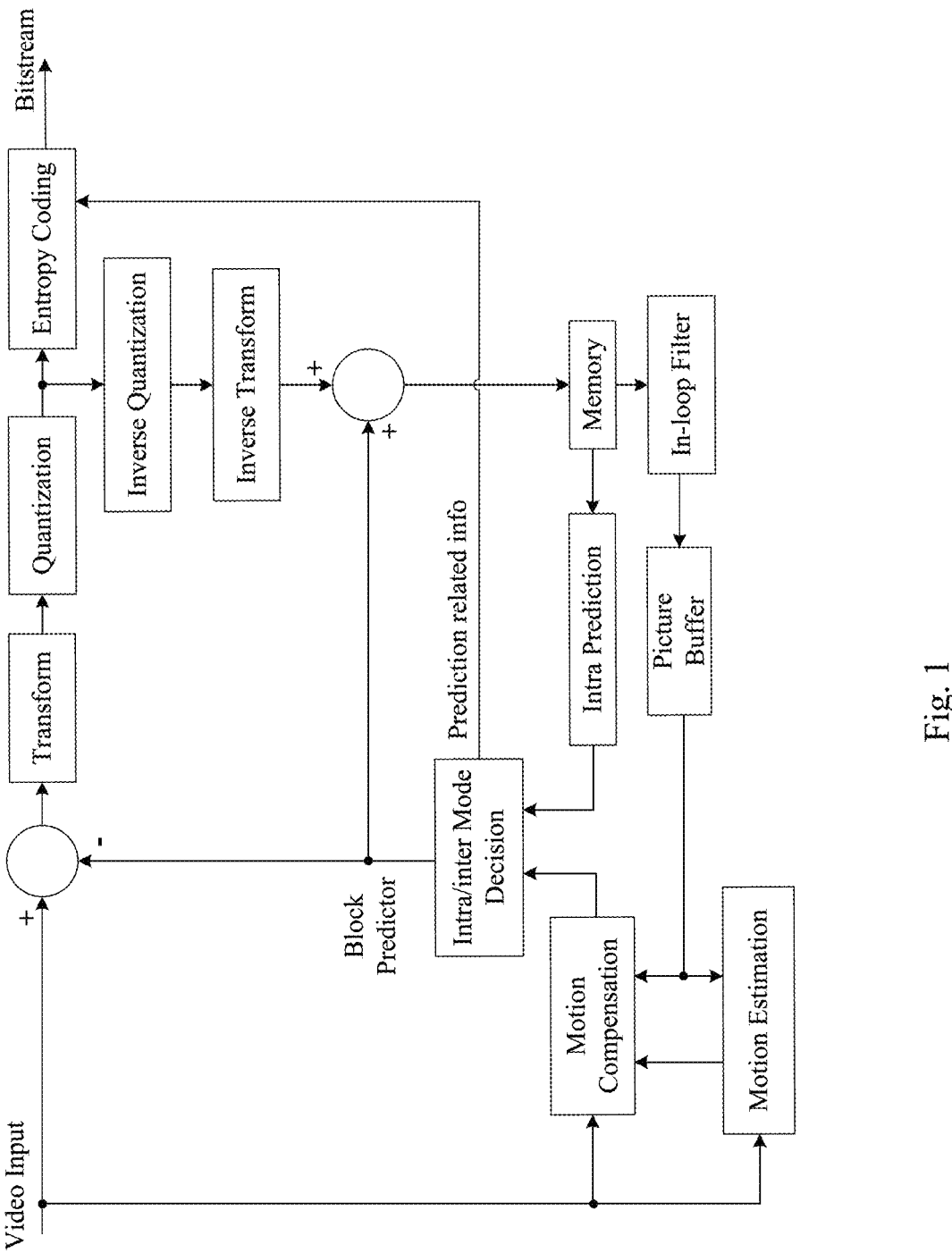
FIG. 1 illustrates a block diagram of a generic block-based hybrid video encoding system.
Figures 2A, 2B, 2C, 2D, 2E:
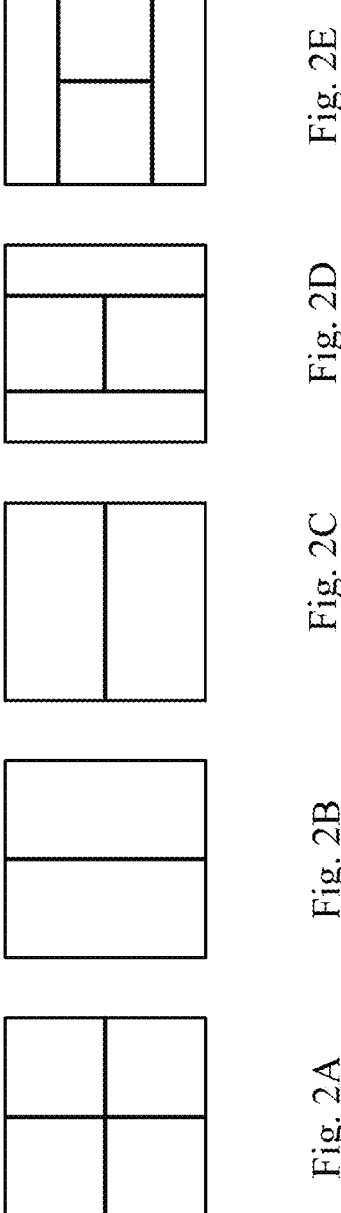
FIG. 2A to 2E illustrate five splitting types, comprising quaternary partitioning, horizontal binary partitioning, vertical binary partitioning, horizontal ternary partitioning, and vertical ternary partitioning.

Similar to all the preceding video coding standards, the ECM is built upon the block-based hybrid video coding framework. FIG. 1 illustrates a block diagram of a generic block-based hybrid video encoding system. The input video signal is processed block by block (called coding units (CUs)). In ECM-1.0, a CU can be up to 128×128 pixels. However, same to the VVC, one coding tree unit (CTU) is split into CUs to adapt to varying local characteristics based on quad/binary/ternary-tree. In the multi-type tree structure, one CTU is firstly partitioned by a quad-tree structure. Then, each quad-tree leaf node can be further partitioned by a binary and ternary tree structure. As shown in FIGS. 2A, 2B, 2C, 2D, and 2E, there are five splitting types, quaternary partitioning, vertical binary partitioning, horizontal binary partitioning, vertical extended quaternary partitioning, and horizontal extended quaternary partitioning.

In FIG. 1, spatial prediction and/or temporal prediction may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, one reference picture index is additionally sent, which is used to identify from which reference picture in the reference picture store the temporal prediction signal comes. After spatial and/or temporal prediction, the mode decision block in the encoder chooses the best prediction mode, for example based on the rate-distortion optimization method. The prediction block is then subtracted from the current video block; and the prediction residual is de-correlated using transform and quantized. The quantized residual coefficients are inverse quantized and inverse transformed to form the reconstructed residual, which is then added back to the prediction block to form the reconstructed signal of the CU. Further in-loop filtering, such as deblocking filter, sample adaptive offset (SAO) and adaptive in-loop filter (ALF) may be applied on the reconstructed CU before it is put in the reference picture store and used to code future video blocks. To form the output video bit-stream, coding mode (inter or intra), prediction mode information, motion information, and quantized residual coefficients are all sent to the entropy coding unit to be further compressed and packed to form the bit-stream. It should be noted that the term "block" or "video block" as used herein may be a portion, in particular a rectangular (square or non-square) portion, of a frame or a picture. With reference, for example, to HEVC and VVC, the block or video block may be or correspond to a Coding Tree Unit (CTU), a CU, a Prediction Unit (PU) or a Transform Unit (TU) and/or may be or correspond to a corresponding block, e.g., a Coding Tree Block (CTB), a Coding Block (CB), a Prediction Block (PB) or a Transform Block (TB) and/or to a sub-block.

Figure 3:
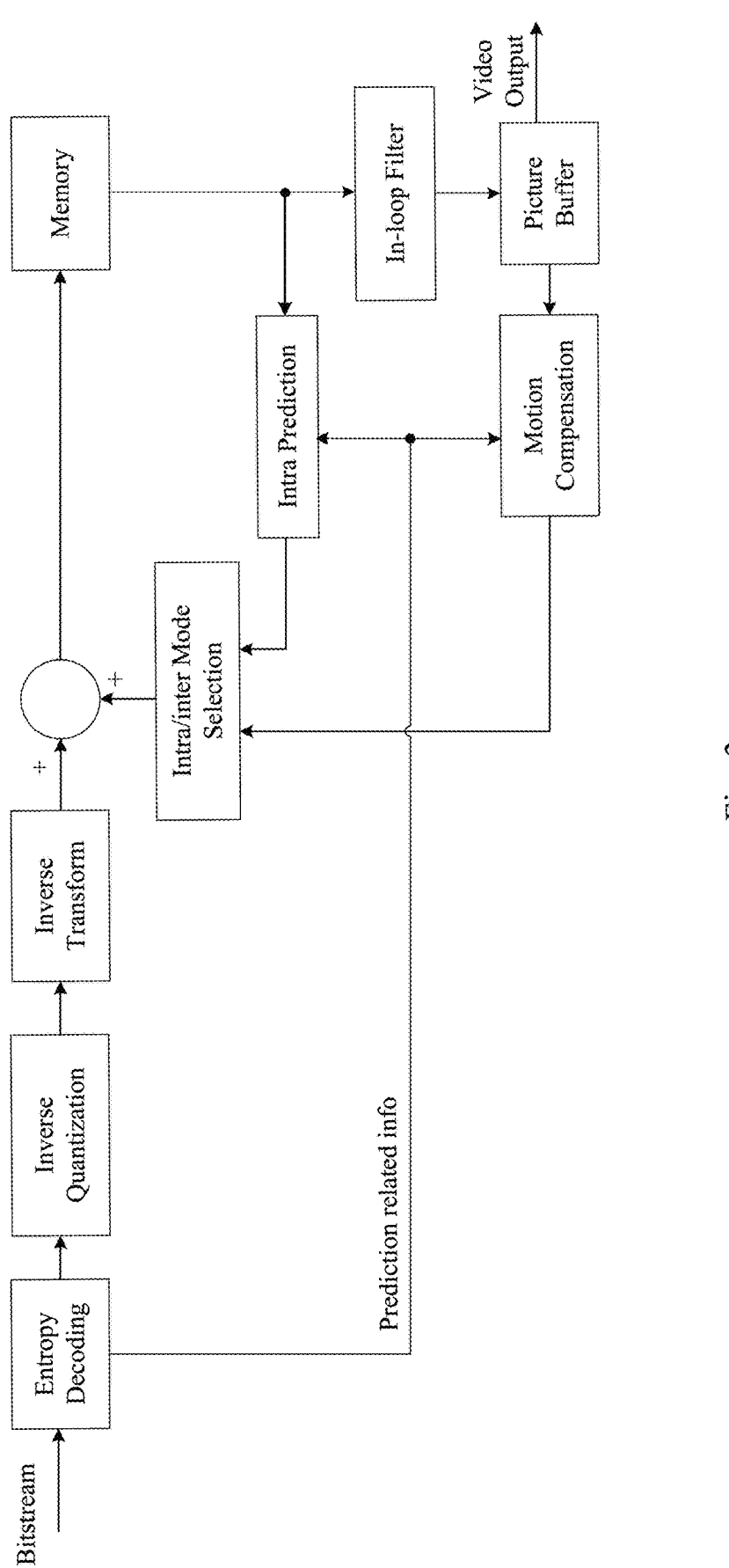
FIG. 3 illustrates a general block diagram of a block-based video decoder.

FIG. 3 illustrates a general block diagram of a block-based video decoder. The video bit-stream is first entropy decoded at entropy decoding unit. The coding mode and prediction information are sent to either the spatial prediction unit (if intra coded) or the temporal prediction unit (if inter coded) to form the prediction block. The residual transform coefficients are sent to inverse quantization unit and inverse transform unit to reconstruct the residual block. The prediction block and the residual block are then added together. The reconstructed block may further go through in-loop filtering before it is stored in reference picture store. The reconstructed video in reference picture store is then sent out to drive a display device, as well as used to predict future video blocks.

The main focus of this disclosure is to further enhance the coding efficiency of the coding tool of cross-component prediction, cross-component linear model (CCLM), that is applied in the ECM. In the following, some related coding tools in the ECM are briefly reviewed. After that, some deficiencies in the existing design of CCLM are discussed. Finally, the solutions are provided to improve the existing CCLM prediction design.

To reduce the cross-component redundancy, a cross-component linear model (CCLM) prediction mode is used in the VVC, for which the chroma samples are predicted based on the reconstructed luma samples of the same CU by using a linear model as follows:

$$pred_C(i, 1) = \alpha \cdot rec'_L(i, j) + \beta \qquad (1)$$

where $pred_C(i, j)$ represents the predicted chroma samples in a CU and $rec_L'(i, j)$ represents the down-sampled reconstructed luma samples of the same CU which are obtained by performing down-sampling on the reconstructed luma samples $rec_L(i, j)$, and $\alpha$ and $\beta$ are linear model parameters which are derived from at most four neighboring chroma samples and their corresponding down-sampled luma samples, which may be referred to as neighboring luma-chroma sample pairs. Suppose that a current chroma block has a size of W×H, then W' and H' are obtained as follows:

W'=W, H'=H when LM mode is applied;
W'=W+H when LM-A mode is applied;
H'=H+W when LM-L mode is applied;
where in the LM mode, above samples and left samples of the CU are used together to calculate the linear model coefficients: in the LM_A mode, only the above samples of the CU are used to calculate the linear model coefficients; and in the LM_L mode, only the left samples of the CU are used to calculate the linear model coefficients.

If locations of above neighboring samples of a chroma block are denoted as S[0, −1] . . . S[W'−1, −1] and locations of left neighboring samples of the chroma block are denoted as S[−1, 0] . . . S[−1, H'−1], positions of four neighboring chroma samples are selected as follows:

S[W'/4, −1], S[3*W'/4, −1], S[−1, H'/4], S[−1, 3*H'/4] are selected as the positions of the four neighboring chroma samples when LM mode is applied and both above and left neighboring samples are available;
S[W/8, −1], S[3*W/8, −1], S[5*W'/8, −1], S[7*W'/8, −1] are selected as the positions of the four neighboring chroma samples when LM-A mode is applied or only the above neighboring samples are available;
S[−1, H'/8], S[−1, 3*H'/8], S[−1, 5*H'/8], S[−1, 7*H'/8] are selected as the positions of the four neighboring chroma samples when LM-L mode is applied or only the left neighboring samples are available.

The four neighboring luma samples corresponding to the selected locations are obtained by a down-sampling operation and the obtained four neighboring luma samples are compared four times to find two larger values: $x^0_A$ and $x^1_A$, and two smaller values: $x^0_B$ and $x^1_B$. Chroma sample values corresponding to the two larger values and the two smaller values are denoted as $y^0_A$, $y^1_A$, $y^0_B$ and $y^1_B$ respectively. Then $X_a$, $X_b$, $Y_a$ and $Y_b$ are derived as:

$$X_a = \left(x^0_A + x^1_A + 1\right) \gg 1; \qquad (2)$$

$$X_b = \left(x^0_B + x^2_B + 1\right) \gg 1;$$

$$Y_a = \left(y^0_A + y^1_A + 1\right) \gg 1;$$

$$Y_b = \left(y^0_B + y^1_B + 1\right) \gg 1$$

Finally, the linear model parameters $\alpha$ and $\beta$ are obtained according to the following equations.

$$\alpha = \frac{Y_a - Y_b}{X_a - X_b} \qquad (3)$$

$$\beta = Y_b - \alpha \cdot X_b \qquad (4)$$

FIG. 4 illustrates an example of the locations of the left and above samples and the sample of the current block involved in the CCLM mode, including locations of left and above samples of an N×N chroma block in the CU and locations of left and above samples of an 2N×2N luma block in the CU.

The division operation to calculate parameter $\alpha$ is implemented with a look-up table. To reduce the memory required for storing the table, the diff value (difference between maximum and minimum values) and the parameter $\alpha$ are expressed by an exponential notation. For example, diff is approximated with a 4-bit significant part and an exponent. Consequently, the table for 1/diff is reduced into 16 elements for 16 values of the significand as follows:

$$DivTable\ [\ ] = \{0, 7, 6, 5, 5, 4, 4, 3, 3, 2, 2, 1, 1, 1, 1, 0\} \qquad (5)$$

This would have a benefit of both reducing the complexity of the calculation as well as the memory size required for storing the needed tables Besides the above template and left template can be used to calculate the linear model coefficients together, they also can be used alternatively in the other 2 LM modes, called LM_A, and LM_L modes.

In LM_T mode, only the above template is used to calculate the linear model coefficients. To get more samples, the above template is extended to (W+H) samples. In LM_L mode, only left template is used to calculate the linear model coefficients. To get more samples, the left template is extended to (H+W) samples.

In LM_LT mode, left and above templates are used to calculate the linear model coefficients.

To match the chroma sample locations for 4:2:0 video sequences, two types of down-sampling filter are applied to luma samples to achieve 2 to 1 down-sampling ratio in both horizontal and vertical directions. The selection of down-sampling filter is specified by a SPS level flag. The two down-sampling filters are as follows, which are corresponding to "type-0" and "type-2" content, respectively.

$$Rec'_L(i, j) = \qquad (6)$$

$$[rec_L(2i-1, 2j-1) + 2 \cdot rec_L(2i-1, 2j-1) + rec_L(2i+1, 2j-1) +$$

$$rec_L(2i-1, 2j) + 2 \cdot rec_L(2i, 2j) + rec_L(2i+1, 2j) + 4] \gg 3$$

$$rec'_L(i, j) = [rec_L(2i, 2j-1) + rec_L(2i-1, 2j) + \qquad (7)$$

$$4 \cdot rec_L(2i, 2j) + rec_L(2i+1, 2j) + rec_L(2i, 2j+1) + 4] \gg 3$$

Note that only one luma line (general line buffer in intra prediction) is used to make the down-sampled luma samples when the upper reference line is at the CTU boundary.

This parameter computation is performed as part of the decoding process, and is not just as an encoder search operation. As a result, no syntax is used to convey the α and β values to the decoder.

For chroma intra mode coding, a total of 8 intra modes are allowed for chroma intra mode coding. Those modes include five traditional intra modes and three cross-component linear model modes (CCLM, LM_A, and LM_L). Chroma mode signalling and derivation process are shown in Table 1. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 1

Derivation of chroma prediction mode
from luma mode when cclm is enabled

| | Corresponding luma intra prediction mode | | | | |
|---|---|---|---|---|---|
| Chroma prediction mode | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | 0 | 50 | 18 | 1 | X |
| 5 | 81 | 81 | 81 | 81 | 81 |
| 6 | 82 | 82 | 82 | 82 | 82 |
| 7 | 83 | 83 | 83 | 83 | 83 |

A single binarization table is used regardless of the value of sps_cclm_enabled_flag as shown in Table 2.

TABLE 2

Unified binarization table for chroma prediction mode

| Value of intra_chroma_pred_mode | Bin string |
|---|---|
| 4 | 00 |
| 0 | 0100 |
| 1 | 0101 |
| 2 | 0110 |
| 3 | 0111 |
| 5 | 10 |
| 6 | 110 |
| 7 | 111 |

8

In Table 2, the first bin indicates whether it is regular (0) or LM modes (1). If it is LM mode, then the next bin indicates whether it is LM_CHROMA (0) or not. If it is not LM_CHROMA, next 1 bin indicates whether it is LM_L (0) or LM_A (1). For this case, when sps_cclm_enabled_flag is 0, the first bin of the binarization table for the corresponding intra_chroma_pred_mode can be discarded prior to the entropy coding. Or, in other words, the first bin is inferred to be 0 and hence not coded. This single binarization table is used for both sps_cclm_enabled_flag equal to 0 and 1 cases. The first two bins in Table 2 are context coded with its own context model, and the rest bins are bypass coded.

In addition, in order to reduce luma-chroma latency in dual tree, when the 64×64 luma coding tree node is partitioned with Not Split (and ISP is not used for the 64×64 CU) or QT, the chroma CUs in 32×32/32×16 chroma coding tree node are allowed to use CCLM in the following way:

If the 32×32 chroma node is not split or partitioned QT split, all chroma CUs in the 32×32 node can use CCLM If the 32×32 chroma node is partitioned with Horizontal BT, and the 32×16 child node does not split or uses Vertical BT split, all chroma CUs in the 32×16 chroma node can use CCLM.

In all the other luma and chroma coding tree split conditions, CCLM is not allowed for chroma CU.

During the ECM development, the simplified derivation of α and β (min-max approximation) is removed. Instead, linear least square solution between causal reconstructed data of down-sampled luma samples and causal chroma samples to derive model parameters α and β.

$$\alpha = \frac{I \times \sum_{i=0}^{I} Rec_C(i) \times Rec'_L(i) - \sum_{i=0}^{I} Rec_C(i) \times \sum_{i=0}^{I} Rec'_L(i)}{I \times \sum_{i=0}^{I} Rec'_L(i) \times Rec'_L(i) - \left(\sum_{i=0}^{I} Rec'_L(i)\right)^2} = \frac{A_1}{A_2} \qquad (8)$$

$$\beta = \frac{\sum_{i=0}^{I} Rec_C(i) - \alpha \times \sum_{i=0}^{I} Rec'_L(i)}{I} \qquad (9)$$

where $Rec_C(i)$ and $Rec'_L(i)$ indicate reconstructed chroma samples and down-sampled luma samples around the target block, I indicates total samples number of neighboring data.

Figure 5A:
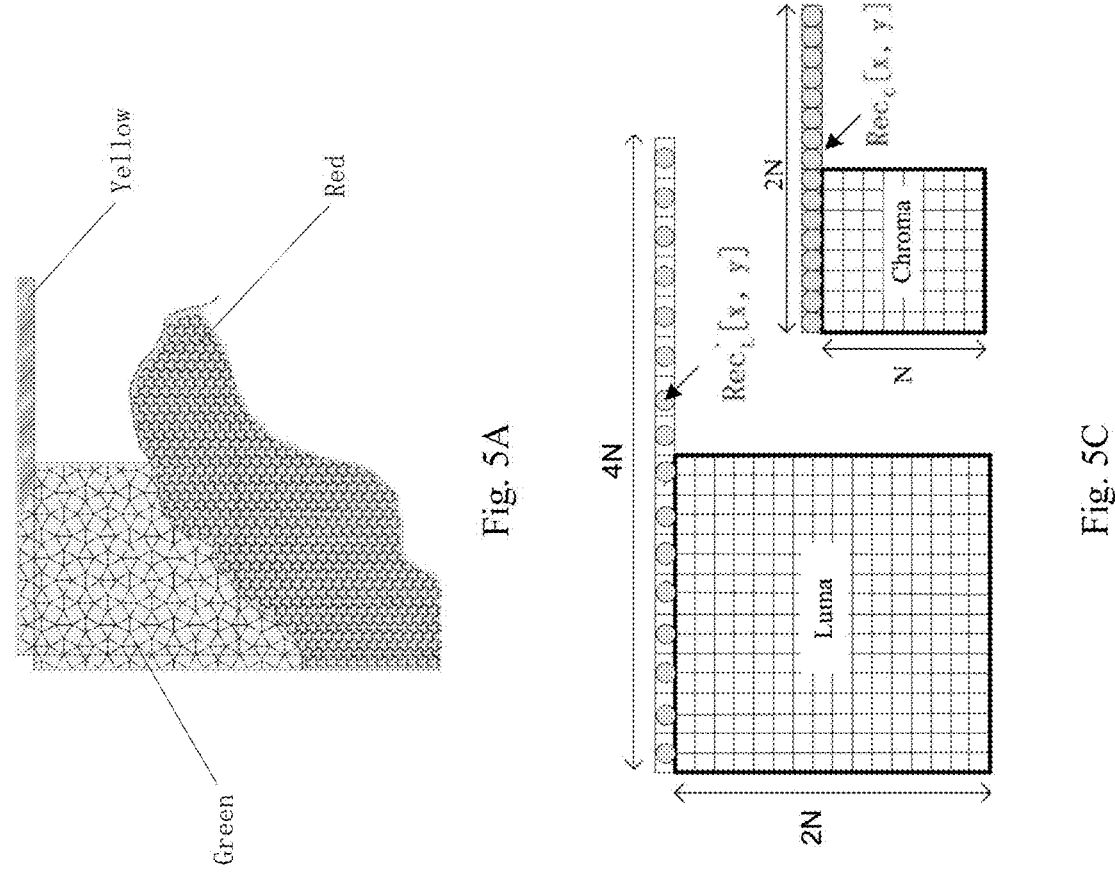
FIG. 5A to 5C illustrate examples of deriving CCLM parameters.
Figure 5B:
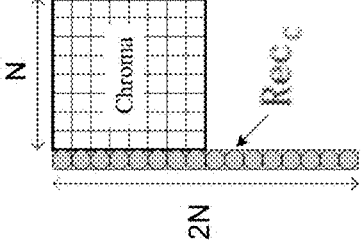
Figure 5C:
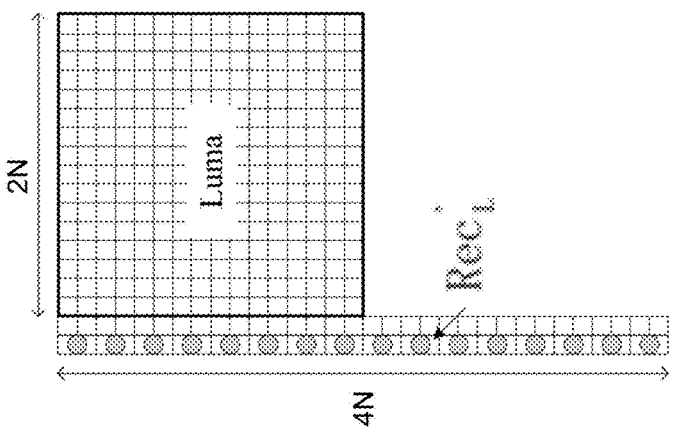

The LM_A, LM_L modes are also called Multi-Directional Linear Model (MDLM). FIG. 5A illustrates an example that MDLM works when the block content cannot be predicted from the L-shape reconstructed region. FIG. 5B illustrates MDLM_L which only uses left reconstructed samples to derive CCLM parameters. FIG. 5C illustrates MDLM_T which only uses top reconstructed samples to derive CCLM parameters.

Figure 6:
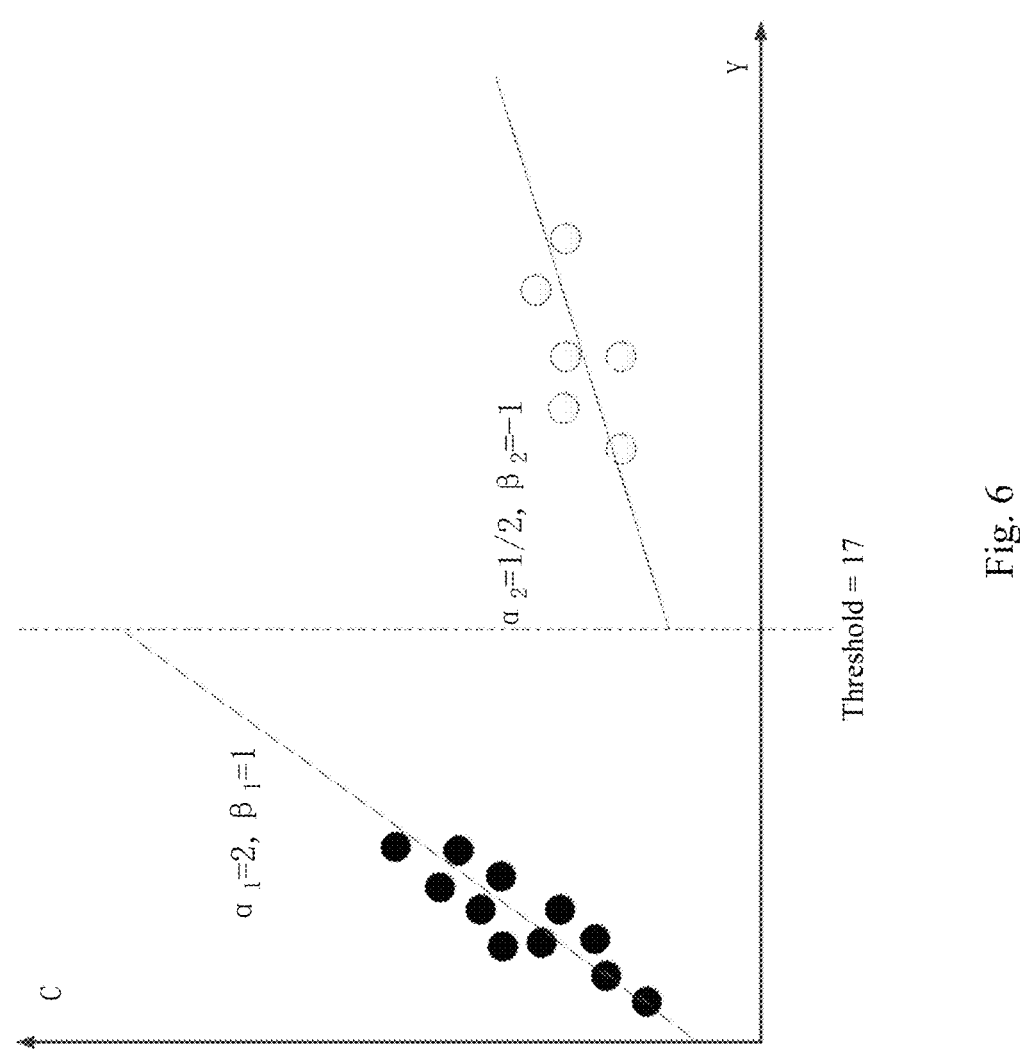
FIG. 6 illustrates an example of classifying the neighboring samples into two groups based on the value Threshold.

In ECM-1.0, Multi-model LM (MMLM) prediction mode is proposed, for which the chroma samples are predicted based on the reconstructed luma samples of the same CU by using two linear models as follows:

$$\begin{cases} pred_C(i, j) = \alpha_1 \cdot rec'_L(i, j) + \beta_1 & \text{if } rec'_L(i, j) \le \text{Threshold} \\ pred_C(i, j) = \alpha_2 \cdot rec'_L(i, j) + \beta_2 & \text{if } rec'_L(i, j) > \text{Threshold} \end{cases} \qquad (10)$$

where $pred_C(i, j)$ represents the predicted chroma samples in a CU and $rec_L'(i, j)$ represents the down-sampled reconstructed luma samples of the same CU. Threshold is calculated as the average value of the neighboring reconstructed luma samples. FIG. 6 illustrates an example of classifying the neighboring samples into two groups based on the value Threshold. For each group, parameter $\alpha_i$ and $\beta_i$, with i equal to 1 and 2 respectively, are derived from the straight-line relationship between luma values and chroma values from two samples, which are minimum luma sample A $(X_A, Y_A)$ and maximum luma sample B $(X_B, Y_B)$ inside the group. Here $X_A$, $Y_A$ are the x-coordinate (i.e., luma value) and y-coordinate (i.e., chroma value) value for sample A, and $X_B$, $Y_B$ are the x-coordinate and y-coordinate value for sample B. The linear model parameters $\alpha$ and $\beta$ are obtained according to the following equations.

$$\alpha = \frac{y_B - y_A}{x_B - x_A} \tag{11}$$

$$\beta = y_A - \alpha x_A$$

Such a method is also called min-max method. The division in the equation above could be avoided and replaced by a multiplication and a shift.

For a coding block with a square shape, the above two equations are applied directly. For a non-square coding block, the neighboring samples of the longer boundary are first subsampled to have the same number of samples as for the shorter boundary.

Besides the scenario wherein the above template and the left template are used together to calculate the linear model coefficients, the two templates also can be used alternatively in the other two MMLM modes, called MMLM_A, and MMLM_L modes.

In MMLM_A mode, only pixel samples in the above template are used to calculate the linear model coefficients. To get more samples, the above template is extended to the size of (W+W). In MMLM_L mode, only pixel samples in the left template are used to calculate the linear model coefficients. To get more samples, the left template is extended to the size of (H+H).

Note that when the upper reference line is at the CTU boundary, only one luma row (which is stored in line buffer for intra prediction) is used to make the down-sampled luma samples.

For chroma intra mode coding, a total of 11 intra modes are allowed for chroma intra mode coding. Those modes include five traditional intra modes and six cross-component linear model modes (CCLM, LM_A, LM_L, MMLM, MMLM_A and MMLM_L). Chroma mode signaling and derivation process are shown in Table 3. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

TABLE 3

Derivation of chroma prediction mode
from luma mode when MMLM_is enabled

| Chroma prediction mode | Corresponding luma intra prediction mode | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |

TABLE 3-continued

Derivation of chroma prediction mode
from luma mode when MMLM_is enabled

| Chroma prediction mode | Corresponding luma intra prediction mode | | | | |
|---|---|---|---|---|---|
| | 0 | 50 | 18 | 1 | X (0 <= X <= 66) |
| 2 | 18 | 18 | 66 | 18 | 18 |
| 3 | 1 | 1 | 1 | 66 | 1 |
| 4 | 81 | 81 | 81 | 81 | 81 |
| 5 | 82 | 82 | 82 | 82 | 82 |
| 6 | 83 | 83 | 83 | 83 | 83 |
| 7 | 84 | 84 | 84 | 84 | 84 |
| 8 | 85 | 85 | 85 | 85 | 85 |
| 9 | 86 | 86 | 86 | 86 | 86 |
| 10 | 0 | 50 | 18 | 1 | X |

Figure 7:
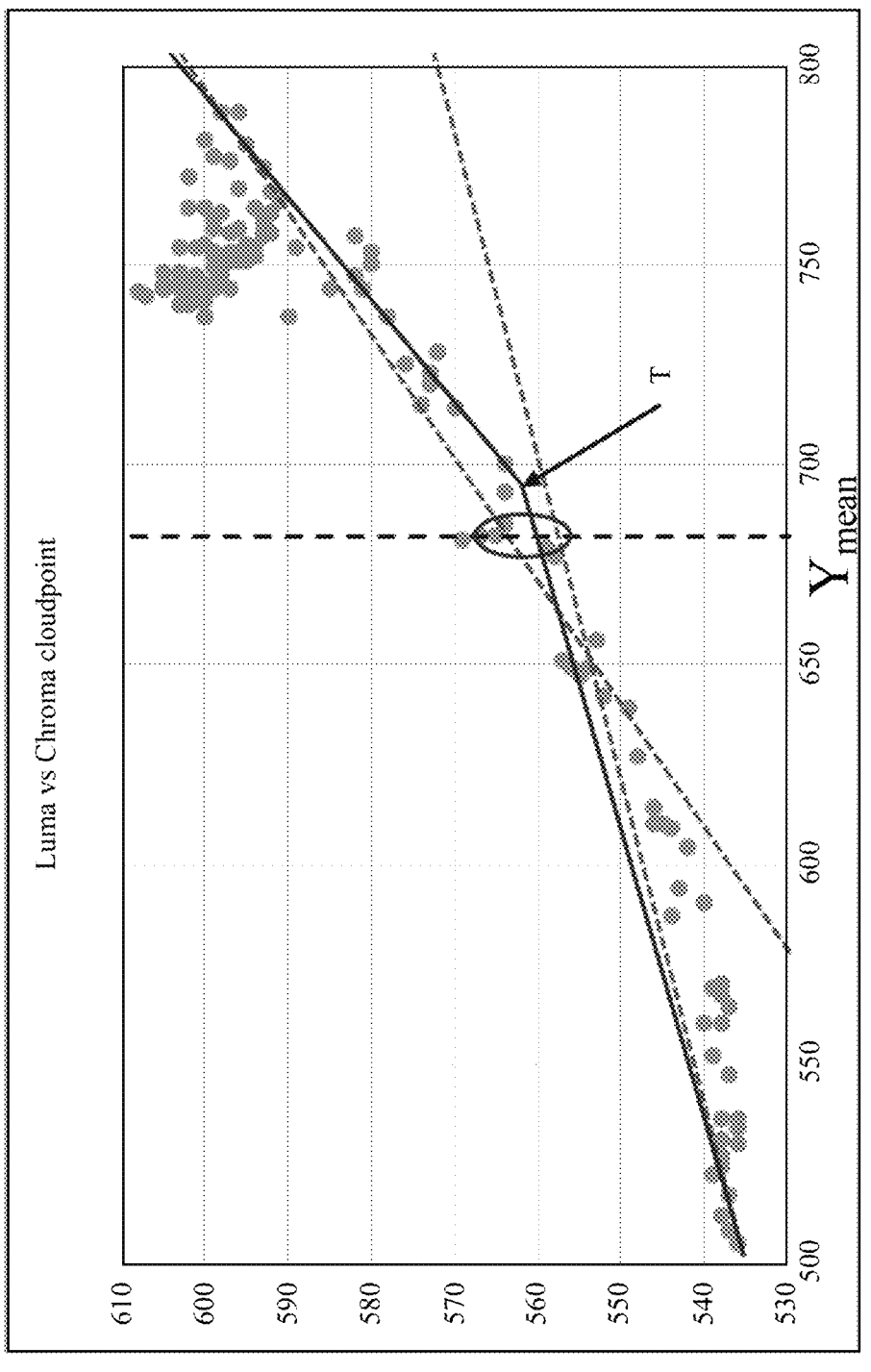
FIG. 7 shows an example of classifying the neighboring samples into two groups based on a knee point.

MMLM and LM modes may also be used together in an adaptive manner. For MMLM, two linear models are as follows:

$$\begin{cases} pred_C(i, j) = \alpha_1 \cdot rec_L'(i, j) + \beta_1 & \text{if } rec_L'(i, j) \le \text{Threshold} \\ pred_C(i, j) = \alpha_2 \cdot rec_L'(i, j) + \beta_2 & \text{if } rec_L'(i, j) > \text{Threshold} \end{cases} \tag{12}$$

where $pred_C(i, j)$ represents the predicted chroma samples in a CU and $rec_L'(i, j)$ represents the downsampled reconstructed luma samples of the same CU. Threshold can be simply determined based on the luma and chroma average values together with their minimum and maximum values. FIG. 7 shows an example of classifying the neighboring samples into two groups based on the knee point, T, indicated by an arrow. Linear model parameter $\alpha_1$ and $\beta_1$ are derived from the straight-line relationship between luma values and chroma values from two samples, which are minimum luma sample A $(X_A, Y_A)$ and the Threshold $(X_T, Y_T)$. Linear model parameter $\alpha_2$ and $\beta_2$ are derived from the straight-line relationship between luma values and chroma values from two samples, which are maximum luma sample B $(X_B, Y_B)$ and the Threshold $(X_T, Y_T)$. Here $X_A$, $Y_A$ are the x-coordinate (i.e., luma value) and y-coordinate (i.e., chroma value) value for sample A, and $X_B$, $Y_B$ are the x-coordinate and y-coordinate value for sample B. The linear model parameters $\alpha_i$ and $\beta_i$ for each group, with i equal to 1 and 2 respectively, are obtained according to the following equations.

$$\alpha_1 = \frac{Y_T - Y_A}{X_T - X_A} \tag{13}$$

$$\beta_1 = Y_A - \alpha_1 X_A$$

$$\alpha_2 = \frac{Y_B - Y_T}{X_B - X_T}$$

$$\beta_2 = Y_T - \alpha_2 X_T$$

For a coding block with a square shape, the above equations are applied directly. For a non-square coding block, the neighboring samples of the longer boundary are first subsampled to have the same number of samples as for the shorter boundary.

Besides the scenario wherein the above template and the left template are used together to determine the linear model coefficients, the two templates also can be used alternatively in the other two MMLM modes, called MMLM_A, and MMLM_L modes respectively.

In MMLM_A mode, only pixel samples in the above template are used to calculate the linear model coefficients. To get more samples, the above template is extended to the size of (W+W). In MMLM_L mode, only pixel samples in the left template are used to calculate the linear model coefficients. To get more samples, the left template is extended to the size of (H+H).

Note that when the upper reference line is at the CTU boundary, only one luma row (which is stored in line buffer for intra prediction) is used to make the down-sampled luma samples.

For chroma intra mode coding, there is a condition check used to select LM modes (CCLM, LM_A, and LM_L) or multi-model LM modes (MMLM, MMLM_A, and MMLM_L). The condition check is as follows:

$$\begin{cases} LM \text{ modes} & \text{if } (((Y_T - Y_A) \le d \parallel (Y_B - Y_T) \le d \ \& \\ & (\text{block area} \ge BlkSizeThres_{LM})) \\ MMLM \text{ modes} & \text{if } (((Y_T - Y_A) > d \ \&\& \ (Y_B - Y_T) > d \ \& \\ & (\text{block area} \ge BloSizeThres_{LM})) \end{cases} \quad (14)$$

where BlkSizeThres$_{LM}$ represents the smallest block size of LM modes and BlkSizeThres$_{MM}$ represents the smallest block size of MMLM modes. The symbol d represents a pre-determined threshold value. In one example, d may take a value of 0. In another example, d may take a value of 8.

For chroma intra mode coding, a total of 8 intra modes are allowed for chroma intra mode coding. Those modes include five traditional intra modes and three cross-component linear model modes. Chroma mode signaling and derivation process are shown in Table 1. It is worth noting that for a given CU, if it is coded under linear model mode, whether it is a conventional single model LM mode or a MMLM mode is determined based on the condition check above. Unlike the case shown in Table 3, there are no separate MMLM modes to be signaled. Chroma mode coding directly depends on the intra prediction mode of the corresponding luma block. Since separate block partitioning structure for luma and chroma components is enabled in I slices, one chroma block may correspond to multiple luma blocks. Therefore, for Chroma DM mode, the intra prediction mode of the corresponding luma block covering the center position of the current chroma block is directly inherited.

Figure 8:
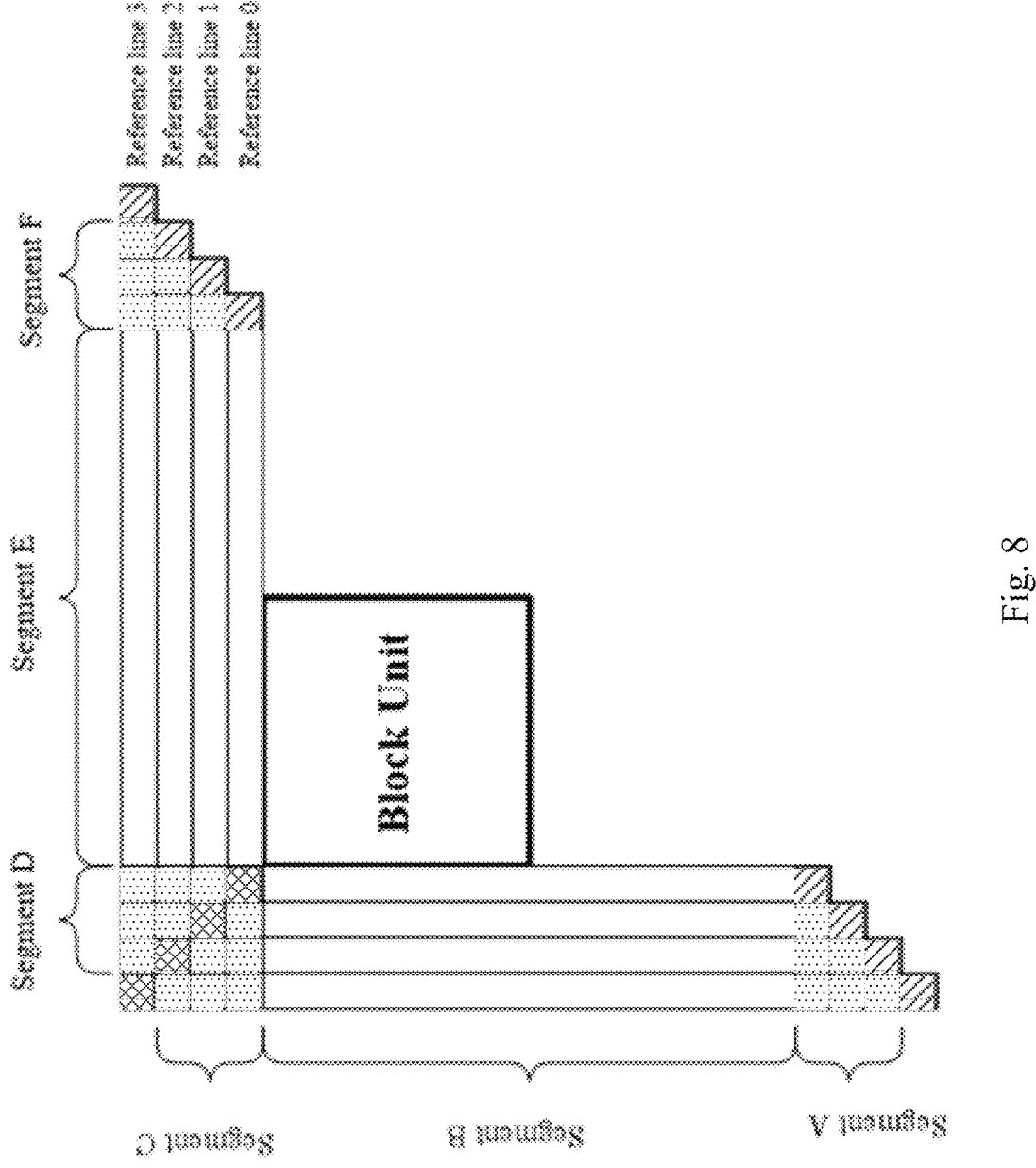
FIG. 8 illustrates an example of four reference lines neighboring to a prediction block.

Multiple reference line (MRL) intra prediction uses more reference lines for intra prediction. In FIG. 8, an example of 4 reference lines is depicted, where the samples of segments A and F are not fetched from reconstructed neighboring samples but padded with the closest samples from Segment B and E, respectively. HEVC intra-picture prediction uses the nearest reference line (i.e., reference line 0). In MRL, 2 additional lines (reference line 1 and reference line 3) are used.

The index of selected reference line (mrl_idx) is signaled and used to generate intra predictor. For reference line idx, which is greater than 0, only include additional reference line modes in MPM list and only signal mpm index without remaining mode. The reference line index is signaled before intra prediction modes, and Planar mode is excluded from intra prediction modes in case a nonzero reference line index is signaled.

MRL is disabled for the first line of blocks inside a CTU to prevent using extended reference samples outside the current CTU line. Also, PDPC is disabled when additional line is used. For MRL mode, the derivation of DC value in DC intra prediction mode for non-zero reference line indices is aligned with that of reference line index 0. MRL requires the storage of 3 neighboring luma reference lines with a CTU to generate predictions. The Cross-Component Linear Model (CCLM) tool also requires 3 neighboring luma reference lines for its down-sampling filters. The definition of MRL to use the same 3 lines is aligned as CCLM to reduce the storage requirements for decoders.

In the existing CCLM or MMLM design, the neighboring reconstructed luma-chroma sample pairs are classified into one or more sample groups based on the value Threshold, which only considers the luma DC values. That is, a luma-chroma sample pair is classified by only considering the intensity of the luma sample. However, luma component usually preserves abundant textures, and the current luma sample may be highly correlated with neighboring luma samples, such inter-sample correlation (AC correlation) may benefit the classification of luma-chroma sample pairs and can bring additional coding efficiency.

Figures 9A, 9B:
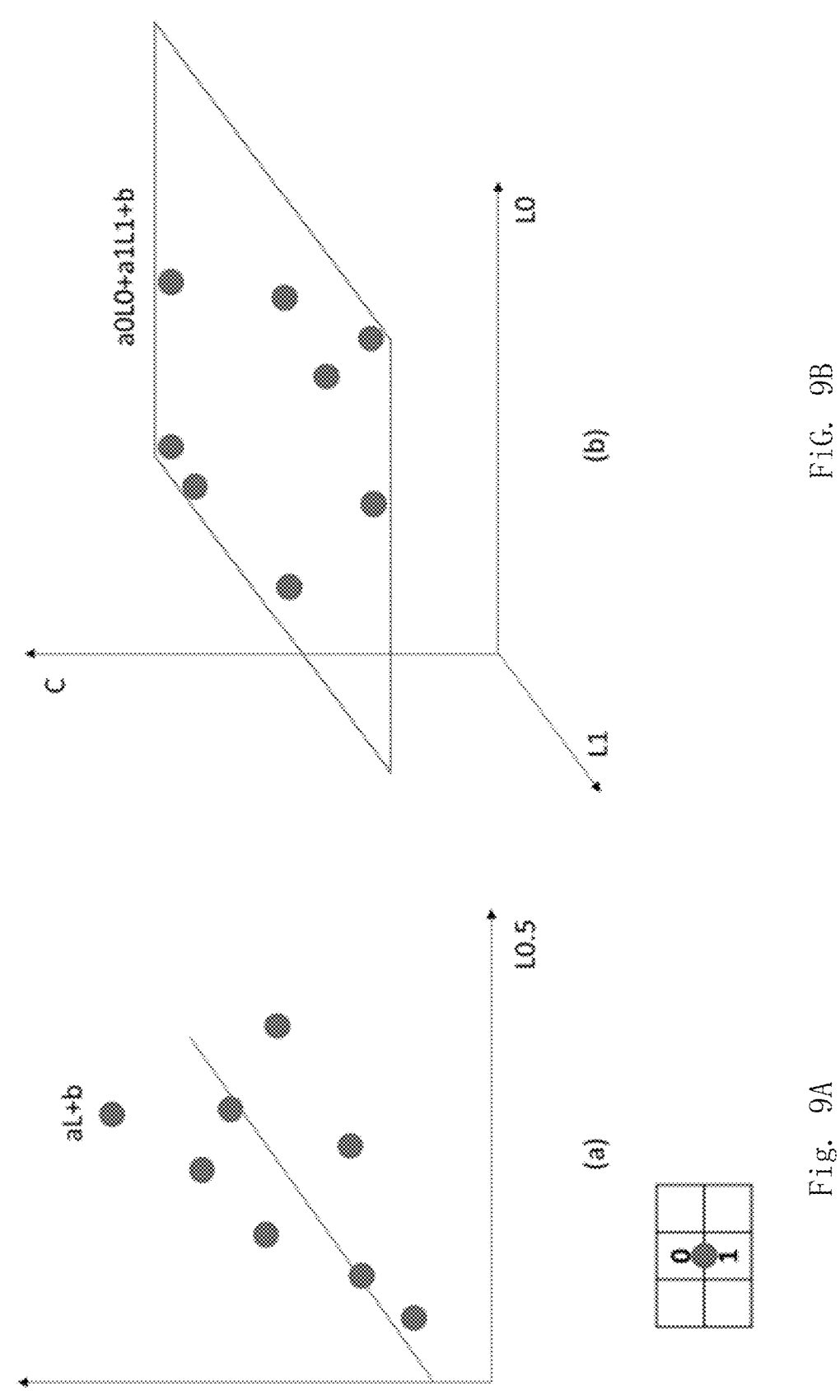
FIGS. 9A and 9B show schematic diagrams for correlation among a chroma sample and one or more luma samples.

Furthermore, as shown in FIG. 9A, the CCLM assumes a given chroma sample only correlates to a corresponding luma sample (L0.5, which can be taken as the fractional luma sample position), and a simple linear regression (SLR) with ordinary least squares (OLS) estimation is used to predict the given chroma sample. However, as shown in FIG. 9B, in some video content, one chroma sample may simultaneously correlate to multiple luma samples (AC or DC correlation), so a multiple linear regression (MLR) model may further improve the prediction accuracy.

The focus of the disclosure is to improve the coding efficiency of luma and chroma components, by introducing classifiers considering luma edge or AC information. Besides the existing band-classified MMLM, the present disclosure provides exemplar proposed classifiers. The process of generating linear prediction models for different sample groups may be similar as CCLM or MMLM (e.g., via a least square method, or a simplified min-max method, etc.), but with different metrices for classification.

The focus of the disclosure is also to derive a filter-based linear model (FLM), to further improve the prediction accuracy.

In one aspect of the present disclosure, a first classifier may be used to classify the neighboring luma samples (e.g., of the neighboring luma-chroma sample pairs) and/or the luma samples corresponding to chroma samples to be predicted. The luma samples corresponding to the chroma samples may be obtained by a down-sampling operation to match the locations of the corresponding chroma samples for 4:2:0 video sequences. For example, a luma sample corresponding to a chroma sample may be obtained by performing a down-sampling operation on more than one (e.g., 4) reconstructed luma samples corresponding to the chroma sample (e.g., located around the chroma sample). Alternatively, the luma samples may obtained directly from the reconstructed luma samples in a case of 4:4:4 video sequences, for example. Alternatively, the luma samples may be obtained from respective ones of the reconstructed luma samples that are at respective collocated positions for the corresponding chroma samples. For example, a luma sample to be classified may be obtained from one of four reconstructed luma samples corresponding to the chroma sample that is at a left-top position of the four reconstructed luma samples, which may be considered as a collocated position for the chroma sample. The first classifier may classify luma samples according to their edge strengths. For example, one direction (e.g., 0-degree, 45-degree, or 90-degree, etc.) may be selected to calculate the edge strength. A direction may be formed by a current sample and a neighboring sample along the direction (e.g., a neighboring sample located at the right-top of the current sample for 45-degree). An edge strength may be calculated by subtracting the neighbor sample from the current sample. The edge strength may be quantized into one of M segments by M−1 thresholds, and the first classifier may use M classes to classify the current sample. Alternatively or additionally, N directions may be formed by a current sample and N neighboring samples along the N directions. N edge strengths may be calculated by subtracting N neighboring samples from the current sample, respectively. Similarly, if each of the N edge strengths may be quantized into one of M segments by M−1 thresholds, then the first classifier may use MN classes to classify the current sample.

In another aspect of the present disclosure, a second classifier may be used to classify according to a local pattern. For example, a current luma sample Y0 may be compared with its neighboring N luma samples Yi. A score may be added by one if the value of Y0 is greater than that of Yi, otherwise, the score may be reduced by one. The sore may be quantized to form K classes. The second classifier may classify a current sample into one of the K classes. For example, the neighboring luma samples may be obtained from four neighbors that are located above, left, right and below the current luma samples, i.e., without diagonal neighbors.

In one or more aspects of the present disclosure, a plurality of the first classifier, the second classifier, or different instances of the first or second classifier or other classifiers described herein may be combined. For example, a first classifier may be combined with the existing MMLM threshold-based classifier. For another example, instance A of the first classifier may be combined with another instance B of the first classifier, where the instance A and B employ different directions (e.g., employing vertical and horizontal directions, respectively).

It will be appreciated by those skilled in the art that though the existing CCLM design in the VVC standard is used as the basic CCLM method in the description, the proposed cross-component method described in the disclosure can also be applied to other prediction coding tools with similar design spirits. For example, for the chroma from luma (CfL) in the AV1 standard, the proposed method can also be applied by dividing luma/chroma sample pairs into multiple sample groups.

It will be appreciated by those skilled that Y/Cb/Cr also can be denoted as Y/U/V in video coding area. If video data is of RGB format, the proposed method can also be applied by simply mapping YUV notation to GBR, for example.

FIG. 14 illustrates a workflow of a method 1400 for decoding video data according to one or more aspects of the present disclosure. The method 1400 may use any one of the classifiers described herein or any combination thereof and may be used by a video decoder (e.g., of FIG. 3). At step 1410, a video block (e.g., a CU) of video data may be obtained from a bitstream. For example, an encoded block of luma samples of the video data may be received. The encoded block of luma samples may be decoded to obtain reconstructed luma samples. At step 1420, a luma sample may be classified into one of a plurality of sample groups based on edge information of the luma sample. The luma sample may correspond to a chroma sample to be predicted of the video block and may be obtained from one or more of the reconstructed luma samples. For example, a downsampling operation may be or not be performed on the reconstructed luma samples to obtain the luma sample. For example, the classification may be performed by using one of the classifiers described herein or any combination thereof. At step 1430, the chroma sample may be predicted by applying one of a plurality of linear prediction models corresponding to the classified sample group to the luma sample.

In an embodiment, the classifying the luma sample into the one of the plurality of sample groups may be further based on intensity value of the luma sample (e.g., combined with the existing MMLM threshold-based classifier).

In an embodiment, each of the plurality of sample groups may correspond to a different linear prediction model of the plurality of linear prediction models.

In an embodiment, the edge information may comprise a direction and a strength of an edge of the luma sample.

In an embodiment, the classifying the luma sample into the one of the plurality of sample groups may comprise classifying the luma sample into the one of the plurality of sample groups based on a strength of an edge along one direction for the luma sample, or multiple strengths of edges along different directions for the luma samples.

In an embodiment, the method 1400 may comprise classifying neighboring luma samples around the video block into the plurality of sample groups based on edge information of the neighboring luma samples. Each of the plurality of linear prediction models may be derived from neighboring luma samples classified into a sample group corresponding to that linear prediction model and neighboring chroma samples corresponding to the neighboring luma samples classified into the sample group (e.g., neighboring luma-chroma sample pairs with luma samples therein being classified into the sample group corresponding to that linear prediction model), for example, through a least square method, or a simplified min-max method, etc.

FIG. 15 illustrates a workflow of a method 1500 for encoding video data according to one or more aspects of the present disclosure. The method 1500 may use any one of the classifiers described herein or any combination thereof and may be used by a video encoder (e.g., of FIG. 1). At step 1510, a video block of video data may be obtained from a video frame. For example, a block of luma samples of the video data may be encoded to obtain an encoded block of luma samples. The encoded block of luma samples may be decoded to obtain reconstructed luma samples. At step 1520, a luma sample corresponding to a chroma sample may be classified into one of a plurality of sample groups based on edge information of the luma sample, wherein the luma sample is obtained from one or more of the reconstructed luma samples. At step 1530, the chroma sample may be predicted by applying one of a plurality of linear prediction models corresponding to the classified sample group to the luma sample.

In one or more aspects of the present disclosure, for a to-be-predicted chroma sample, the reconstructed collocated and neighboring luma samples can be used to predict the chroma sample, to capture the inter-sample correlation among the collocated luma sample, neighboring luma samples, and the chroma sample. The reconstructed luma samples are linear weighted and combined with one "offset" to generate the predicted chroma sample (C: predicted chroma sample, $L_i$: i-th reconstructed collocated or neighboring luma samples, a $\alpha_i$: filter coefficients, $\beta$: offset, N: filter taps). Note the linear weighted plus offset value directly forms the predicted chroma sample (can be low pass, high pass adaptively according to video content), and it is then added by the residual to form the reconstructed chroma sample.

$$C = \sum_{i=0}^{N-1} \alpha_i \cdot L_i + \beta \qquad (15)$$

For a given CU, the top and left reconstructed luma and chroma samples can be used to derive or train the FLM parameters ($\alpha_i$, $\beta$). Like CCLM, $\alpha_i$ and $\beta$ can be derived via OLS. The top and left training samples are collected, and one pseudo inverse matrix is calculated at both encoder and decoder sides to derive the parameters, which are then used to predict the chroma samples in the given CU. Let N denotes the number of filter taps applied on luma samples, M denotes the total top and left reconstructed luma and chroma sample pairs used for training parameters, $$L_j^i$$

denotes luma sample with the i-th sample pair and the j-th filter tap, $C^i$ denotes the chroma sample with the i-th sample pair, the following equations show the derivation of the pseudo inverse matrix $A^+$, and also the parameters. FIG. 10 shows an example that N is 6 (6-tap), M is 8, top 2 rows and left 3 columns luma samples and top 1 row and left 1 column chroma samples are used to derive or train the parameters.

$$C^0 = \alpha_0 \cdot L_0^0 + \alpha_1 \cdot L_1^0 + \ldots + \alpha_{N-1} \cdot L_{N-1}^0 + \beta \qquad (16)$$

$$C^1 = \alpha_0 \cdot L_0^1 + \alpha_1 \cdot L_1^1 + \ldots + \alpha_{N-1} \cdot L_{N-1}^1 + \beta$$

$$\vdots$$

$$C^{M-1} = \alpha_0 \cdot L_0^{M-1} + \alpha_1 \cdot L_1^{M-1} + \ldots + \alpha_{N-1} \cdot L_{N-1}^{M-1} + \beta$$

$$\begin{bmatrix} C^0 \\ C^1 \\ \vdots \\ \vdots \\ C^{M-1} \end{bmatrix} = \begin{bmatrix} L_0^0 & L_1^0 & \ldots & L_{N-1}^0 & 1 \\ L_0^1 & L_1^1 & \ldots & L_{N-1}^1 & 1 \\ \vdots & \vdots & \ldots & \vdots & \vdots \\ \vdots & \vdots & \ldots & \vdots & \vdots \\ L_0^{M-1} & L_1^{M-1} & \ldots & L_{N-1}^{M-1} & 1 \end{bmatrix} \begin{bmatrix} \alpha_0 \\ \alpha_1 \\ \vdots \\ \alpha_{N-1} \\ \beta \end{bmatrix}$$

$$b = Ax$$

$$x = \left( A^T A \right)^{-1} A^T b = A^+ b$$

Please note that one can predict the chroma sample by only $\alpha_i$ without the offset $\beta$, which may be a subset of the proposed method.

Please note that though the existing CCLM design in the VVC standard is used as the basic CCLM method in the following description, to a person skilled in the art of video coding, the proposed cross-component method described in the disclosure can also be applied to other prediction coding tools with similar design spirits. For example, for the chroma from luma (CfL) in the AV1 standard, the proposed FLM can also be applied by including multiple luma samples to the MLR model.

Note Y/Cb/Cr also can be denoted as Y/U/V in video coding area.

Note if the video is RGB format, the proposed FLM can also be applied by simply mapping YUV notation to GBR in the below paragraphs, for example.

Note the figures in this disclosure can be combined with all examples mentioned in this disclosure.

FIG. 16 illustrates a workflow of a method 1600 for encoding video data according to one or more aspects of the present disclosure. At step 1610, a video block (e.g., a CU comprising a luma block and/or a chroma block) may be obtained from a video frame. At step 1620, a region used to derive a multiple linear regression (MLR) model may be determined. For example, the region may comprise left one or more columns and/or top one or more rows of reconstructed chroma and luma samples neighboring to the chroma block and its collocated luma block, e.g., left 3 columns and top 2 rows of reconstructed luma sample neighboring to the collocated luma block, and left 1 column and top 1 row neighboring to the chroma block, as shown in FIG. 10.

At step 1630, luma and chroma sample values in the region may be obtained. For example, values of the reconstructed luma and chroma samples in the region may be directed used without any modifying, such as down-sampling, etc.

At step 1640, the MLR model may be derived using the luma and chroma sample values in the region. The MLR model may comprise at least two coefficients $\alpha_i$ and one offset $\beta$. For example, an MLR model with six coefficients $\alpha_i$ and one offset $\beta$ may be derived, to use six luma samples and one offset to predict one chroma sample. The derivation of the MLR model may comprise a pseudo inverse matrix calculation and a normal equation, and to derive the scalar B, the rightmost column in $A^+$ must be set to 1.

At step 1650, each of chroma samples in the video block may be predicted by applying the MLR model to corresponding luma samples for that chroma sample. The corresponding luma samples for each chroma sample (e.g., chroma samples 0', as shown in FIG. 10) may comprise collocated luma samples (e.g., luma samples 0', 1', 2', 3', 4' and 5', as shown in FIG. 10) for that chroma sample. For example, values of the reconstructed collocated luma samples may be directed used without any modifying, such as down-sampling, etc.

At step 1660, an encoded video block may be obtained using the predicted chroma samples. For example, the encoded video block may be included in a bitstream to transmit or for storage.

Figure 17:
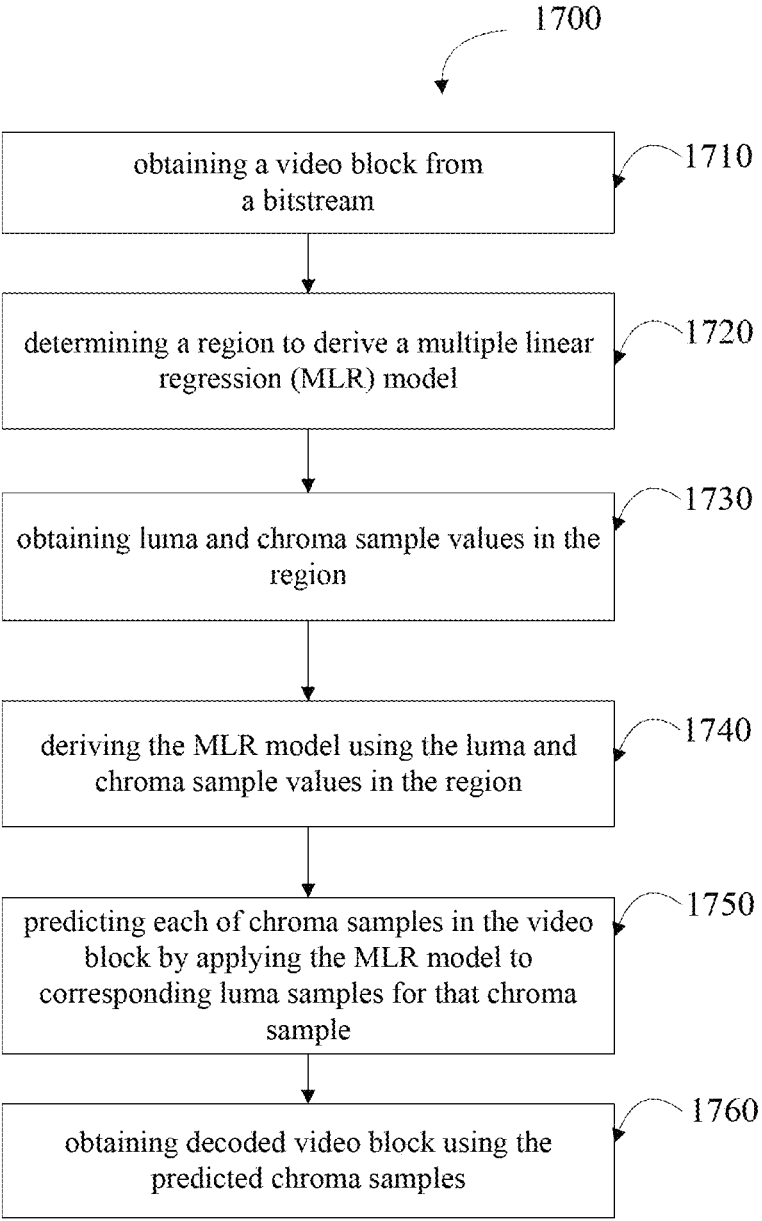
FIG. 17 illustrates a workflow of a method for decoding video data according to one or more aspects of the present disclosure.

FIG. 17 illustrates a workflow of a method 1700 for decoding video data according to one or more aspects of the present disclosure. At step 1710, a video block (e.g., a CU) may be obtained from a bitstream. At step 1720, a region used to derive a multiple linear regression (MLR) model may be determined. At step 1730, luma and chroma sample values in the region may be obtained. At step 1740, the MLR model may be derived using the luma and chroma sample values in the region. At step 1750, each of chroma samples in the video block may be predicted by applying the MLR model to corresponding luma samples for that chroma sample. At step 1760, a decoded video block may be obtained using the predicted chroma samples.

To further improve the coding performance, additional designs may be used in the FLM prediction. As shown in FIG. 10, a 6-tap luma filter is used for the FLM prediction. However, though a multiple tap filter can fit well on training data (e.g., top and left neighboring reconstructed luma and chroma samples), in some cases that training data do not capture full characteristics of testing data, it may result in overfitting and may not predict well on testing data (i.e., the to-be-predicted chroma block samples). Also, different filter shapes may adapt well to different video block content, leading to more accurate prediction.

To address this issue, the filter shape and number of filter taps can be predefined or signaled or switched in Sequence Parameter Set (SPS), Adaptation Parameter Set (APS), Picture Parameter Set (PPS), Picture Header (PH), Slice Header (SH), Region, CTU, CU, Subblock, or Sample level. A set of filter shape candidates can be predefined, and a selection on the set of filter shape candidates may be signaled or switched in SPS, APS, PPS, PH, SH, Region, CTU, CU, Subblock, or Sample level. Different components (e.g., U and V) may have different filter switch control. For example, a set of filter shape candidates (e.g., indicated by index 0~5) may be predefined, and a filter shape (1, 2) may denote a 2-tap luma filter, a filter shape (1, 2, 4) may denote a 3-tap luma filter and the like, as shown in FIG. 10. The filter shape selection of U and V components can be switched in PH or in CU or CTU level. Note N-tap can represent N-tap with or without the offset β as described herein. One example is given as below.

| predefined filter shape candidates: | | # of filter taps | filter shape |
|---|---|---|---|
| idx | 0 | 2 | (1, 2) |
| idx | 1 | 2 | (1, 4) |
| idx | 2 | 2 | (1, 5) |
| idx | 3 | 3 | (1, 2, 4) |
| idx | 4 | 4 | (1, 2, 4, 5) |
| idx | 5 | 6 | (0, 1, 2, 3, 4, 5) |

| POC | comp | selected filter shape idx | |
|---|---|---|---|
| 0 | U | 3 | PH switch |
| | V | 0~5 | CU switch |
| 1 | U | 4 | PH switch |
| | V | 0~2 | CTU switch |

In one aspect of the present disclosure, different chroma types and/or color formats can have different predefined filter shapes and/or taps. For example, a predefined filter shape (1, 2, 4, 5) may be used for 4:2:0 type-0, a predefined filter shape (0, 1, 2, 4, 7) may be used for 4:2:0 type-2, and a predefined filter shape (1, 4) may be used for 4:2:2, and a predefined filter shape (0, 1, 2, 3, 4, 5) may be used for 4:4:4, as shown in FIG. 11.

In another aspect of the present disclosure, unavailable luma and chroma samples for deriving the MLR model can be padded from available reconstructed samples. For example, if using a 6-tap (0, 1, 2, 3, 4, 5) filter as in FIG. 11, for a CU located at the left picture boundary, the left columns including samples (0, 3) are not available (out of picture boundary), so samples (0, 3) are repetitive padding from samples (1, 4) to apply the 6-tap filter. Note that the padding process may be applied in both training data (top and left neighboring reconstructed luma and chroma samples) and testing data (the luma and chroma samples in the CU(s)).

FIG. 18 illustrates a workflow of a method 1800 for decoding video data according to one or more aspects of the present disclosure. At step 1810, a video block (e.g., a CU comprising a luma block and/or a chroma block) and filter shape information may be obtained from a bitstream. The filter shape information may indicate a shape of a filter and/or a number of filter taps for deriving a MLR model and applying the MLR. For example, the filter shape information may be signaled in Sequence Parameter Set (SPS), Adaptation Parameter Set (APS), Picture Parameter Set (PPS), Picture Header (PH), Slice Header (SH), Region, Coding Tree Unit (CTU), Coding Unit (CU), Subblock, or Sample level. The filter shape information may comprise an index to one of a plurality of filter shape candidates, to indicate which one of the plurality of filter shape candidates to be used. The plurality of filter shape candidates may be predefined, and may have different filter shapes and/or different numbers of filter taps, e.g., a filter shape (1, 2) with 2-tap, a filter shape (1, 2, 4) with 3-tap, and a filter shape (0, 1, 2, 3, 4, 5) with 6-tap and the like, as shown in FIG. 10 and FIG. 11.

At step 1820, a region to derive a multiple linear regression (MLR) model may be determined. For example, the region may comprise left one or more columns and/or top one or more rows of reconstructed chroma and luma samples neighboring to the chroma block and its collocated luma block, e.g., left 3 columns and top 2 rows of reconstructed luma sample neighboring to the collocated luma block, and left 1 column and top 1 row neighboring to the chroma block, as shown in FIG. 10; or left 3 columns and top 3 rows of reconstructed luma sample neighboring to the collocated luma block, and left 1 column and top 1 row neighboring to the chroma block, as shown in FIG. 11, and the like.

At step 1830, luma and chroma sample values in the region may be obtained. In a case that some samples in the region are unavailable, padding may be used. For example, the padding may be performed by repeating available sample values in the region. For other examples, the padding may be performed by inserting a predefined value (e.g., 0 or 1) and the like.

At step 1840, the MLR model may be derived using the luma and chroma sample values in the region based on the filter shape information. For example, the MLR model may be derived based on the filter shape (0, 1, 2, 3, 4, 5) as shown in FIG. 11 to have six coefficients, or the MLR model may be derived based on the filter shape (0, 1, 2, 3, 4, 5, 6, 7, 8) as shown in FIG. 11 to have nine coefficients, where the pairs of luma and chroma sample values used to train or derive the MLR model may be determined from the region according to the filter shape information.

At step 1850, each of chroma samples in the video block may be predicted by applying the MLR model to corresponding luma samples for that chroma sample based on the filter shape information. The corresponding luma samples used to predict a current chroma sample may be determined based on the filter shape information. In a case that some luma samples of the corresponding luma samples are unavailable, padding may be used. For example, the padding may be performed by repeating the values of available luma sample of the corresponding luma samples for the unavailable ones.

At step 1860, decoded video block may be obtained using the predicted chroma samples. Different chroma components of the video block (e.g., U and V) may be predicted based on the same or different filter shape information. For example, the chroma component U may be predicted using a MLR model based on filter shape information indicating index 3 or 4, and the chroma component V may be predicted using a MLR model based on filter shape information indicating index 0, 1, 2, 3, 4, or 5 in the above example. Different color formats may have different filter information indicating different shapes of filter and/or numbers of filter taps.

Figure 19:
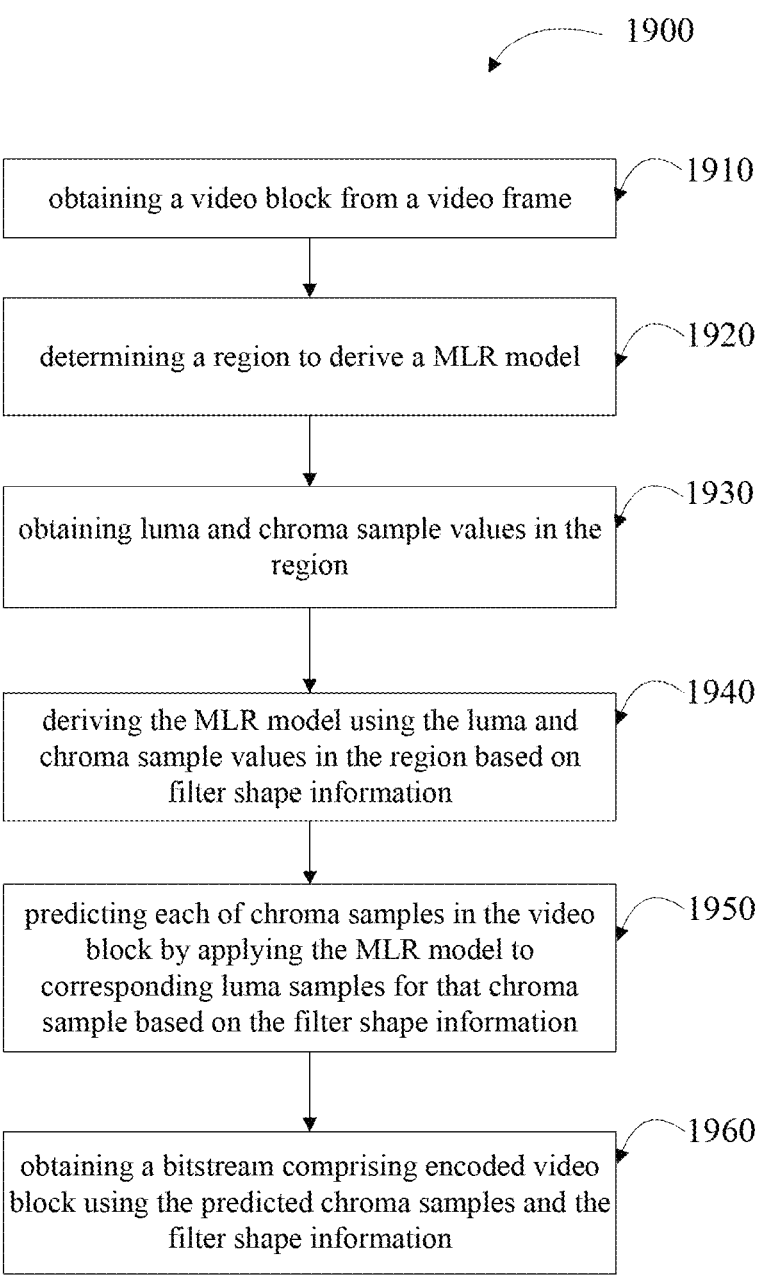
FIG. 19 illustrates a workflow of a method for encoding video data according to one or more aspects of the present disclosure.

FIG. 19 illustrates a workflow of a method 1900 for encoding video data according to one or more aspects of the present disclosure. At step 1910, a video block (e.g., a CU comprising a luma block and/or a chroma block) may be obtained from a video frame. At step 1920, a region to derive a multiple linear regression (MLR) model may be determined. At step 1930, luma and chroma sample values in the region may be obtained. At step 1940, the MLR model may be derived using the luma and chroma sample values in the region based on filter shape information. For example, the encoder may select which one of a plurality of filter shape candidates to be used to derive the MLR model in the FLM prediction. The plurality of filter shape candidates may have different filter shapes and/or different numbers of filter taps. At step 1950, each of chroma samples in the video block may be predicted by applying the MLR model to corresponding luma samples for that chroma sample based on the filter shape information. At step 1960, a bitstream comprising the encoded video block using the predicted chroma samples and the filter shape information may be obtained. For example, the filter shape information may be signaled in Sequence Parameter Set (SPS), Adaptation Parameter Set (APS), Picture Parameter Set (PPS), Picture Header (PH), Slice Header (SH), Region, Coding Tree Unit (CTU), Coding Unit (CU), Subblock, or Sample level in the bitstream. The filter shape information may be carried via a syntax indicating an index to the selected one from the plurality of filter shape candidates. In one example, separate indices may be used to indicate different selected ones from the plurality of filter shape candidates for different chroma components, or for different color formats. In another example, a single index may be used to indicate the same selected one from the plurality of filter shape candidates for the different chroma components. Additionally, or alternatively, the filter shape information may be signaled in the same or different levels (e.g., SPS, APS, PPS, PH, SH, Region, CTU, CU, Subblock, or Sample) for the different chroma components.

As mentioned above, an MLR model (linear equations) must be derived at both the encoder and the decoder. According to one or more aspects of the present disclosure, several methods are proposed to derive the pseudo inverse matrix $A^+$, or to directly solve the linear equations. Other known methods like Newton's method, Cayley-Hamilton method, and Eigendecomposition as mentioned in https://en.wikipedia.org/wiki/Invertible_matrix can also be applied.

In the present disclosure, $A^+$ can be denoted as $A^{-1}$ for simplification. The proposed methods are shown below:

1. Solving $A^{-1}$ by Adjugate Matrix (adjA), Closed Form, Analytic Solution:

Below shows one n×n general form, one 2×2 and one 3×3 cases. If FLM uses 3×3, 2 scalers plus one offset need be solved.

b=Ax, x=$(A^TA)^{-1}A^Tb=A^+b$, denoted as $A^{-1}b$ in this section $$A^{-1} = \frac{1}{\det A} adjA$$

$$(adjA)_{ij} = (-1)^{i+j} \det \tilde{A}_{ji}$$

$\tilde{A}_{ji}$: (n−1)×(n−1) submatrix by removing j-th row and i-th column $$A^{-1} = \begin{bmatrix} a & b \\ c & d \end{bmatrix}^{-1} = \frac{1}{\det A}\begin{bmatrix} \tilde{A}_{11} & -\tilde{A}_{21} \\ -\tilde{A}_{12} & \tilde{A}_{22} \end{bmatrix} = \frac{1}{\det A}\begin{bmatrix} d & -b \\ -c & a \end{bmatrix},$$

$A^{-1} =$ $$\begin{bmatrix} a_{11} & a_{12} & a_{13} \\ a_{21} & a_{22} & a_{23} \\ a_{31} & a_{32} & a_{33} \end{bmatrix}^{-1} = \frac{1}{\det A}\begin{bmatrix} \begin{bmatrix} a_{22} & a_{23} \\ a_{32} & a_{33} \end{bmatrix} & -\begin{bmatrix} a_{12} & a_{13} \\ a_{32} & a_{33} \end{bmatrix} & \begin{bmatrix} a_{12} & a_{13} \\ a_{22} & a_{23} \end{bmatrix} \\ -\begin{bmatrix} a_{21} & a_{23} \\ a_{31} & a_{33} \end{bmatrix} & \begin{bmatrix} a_{11} & a_{13} \\ a_{32} & a_{33} \end{bmatrix} & -\begin{bmatrix} a_{11} & a_{13} \\ a_{22} & a_{23} \end{bmatrix} \\ \begin{bmatrix} a_{21} & a_{22} \\ a_{31} & a_{32} \end{bmatrix} & -\begin{bmatrix} a_{11} & a_{12} \\ a_{31} & a_{32} \end{bmatrix} & \begin{bmatrix} a_{11} & a_{12} \\ a_{21} & a_{22} \end{bmatrix} \end{bmatrix}$$

2. Gauss-Jordan Elimination

The linear equations can be solved using Gauss-Jordan elimination, by an augmented matrix [A $I_n$] and a series of elementary row operation to obtain the reduced row echelon form [I|X]. Below shows 2×2 and 3×3 examples.

$$\begin{bmatrix} a & b & | & 1 & 0 \\ c & d & | & 0 & 1 \end{bmatrix} \to \begin{bmatrix} a & b & | & 1 & 0 \\ 0 & ad-bc & | & -c & a \end{bmatrix} \to \begin{bmatrix} a & b & | & 1 & 0 \\ 0 & 1 & | & \frac{-c}{ad-bc} & \frac{a}{ad-bc} \end{bmatrix} \to$$

$$\begin{bmatrix} a & 0 & | & \frac{ad}{ab-bc} & \frac{-ab}{ad-bc} \\ 0 & 1 & | & \frac{-c}{ad-bc} & \frac{a}{ad-bc} \end{bmatrix} \to \begin{bmatrix} 1 & 0 & | & \frac{d}{ad-bc} & \frac{-b}{ad-bc} \\ 0 & 1 & | & \frac{-c}{ad-bc} & \frac{a}{ad-bc} \end{bmatrix}$$

$$\begin{bmatrix} 2 & 2 & 3 & | & 1 & 0 & 0 \\ -2 & 1 & 2 & | & 0 & 1 & 0 \\ 6 & 3 & 9 & | & 0 & 0 & 1 \end{bmatrix} \to \begin{bmatrix} 2 & 2 & 5 & | & 1 & 0 & 0 \\ 0 & 3 & 7 & | & 1 & 1 & 0 \\ 0 & -3 & -6 & | & -3 & 0 & 1 \end{bmatrix} \to$$

$$\begin{bmatrix} 2 & 2 & 5 & | & 1 & 0 & 0 \\ 0 & 3 & 7 & | & 1 & 1 & 0 \\ 0 & 0 & 1 & | & -2 & 1 & 1 \end{bmatrix} \to \begin{bmatrix} 2 & 2 & 0 & | & 11 & -5 & -5 \\ 0 & 3 & 0 & | & 15 & -6 & -7 \\ 0 & 0 & 1 & | & -2 & 1 & 1 \end{bmatrix} \to$$

$$\begin{bmatrix} 2 & 2 & 0 & | & 11 & -5 & -6 \\ 0 & 1 & 0 & | & 5 & -2 & -\frac{7}{3} \\ 0 & 0 & 1 & | & -2 & 1 & 1 \end{bmatrix} \to \begin{bmatrix} 2 & 0 & 0 & | & 1 & -1 & -\frac{1}{3} \\ 0 & 1 & 0 & | & 5 & -2 & -\frac{7}{3} \\ 0 & 0 & 1 & | & -2 & 1 & 1 \end{bmatrix} \to$$

$$\begin{bmatrix} 1 & 0 & 0 & | & \frac{1}{2} & -\frac{1}{2} & -\frac{1}{3} \\ 0 & 1 & 0 & | & 5 & -2 & -\frac{7}{3} \\ 0 & 0 & 1 & | & -2 & 1 & 1 \end{bmatrix}$$

3. Cholesky Decomposition

To solve Ax=b, A can be firstly decomposed by Cholesky-Crout algorithm, leading to one upper triangular and one lower triangular matrices, and one forward substitution plus one backward substitution can be applied in serial to obtain the solution. Below shows a 3×3 example.

$$A = \begin{bmatrix} a_{11} & a_{12} & a_{13} \\ a_{21} & a_{22} & a_{23} \\ a_{31} & a_{32} & a_{33} \end{bmatrix} = GG^T$$

$$= \begin{bmatrix} g_{11} & 0 & 0 \\ g_{21} & g_{22} & 0 \\ g_{31} & g_{32} & g_{33} \end{bmatrix}\begin{bmatrix} g_{11} & g_{21} & g_{31} \\ 0 & g_{22} & g_{32} \\ 0 & 0 & g_{33} \end{bmatrix}$$

$$= \begin{bmatrix} g_{11}^2 & g_{21}g_{22} & g_{31}g_{22} \\ g_{21}g_{11} & g_{21}^2 + g_{22}^2 & g_{31}g_{22} + g_{32}g_{22} \\ g_{31}g_{11} & g_{31}g_{21} + g_{32}g_{22} & g_{31}^2 + g_{32}^2 + g_{33}^2 \end{bmatrix}$$

$$g_{11} = \sqrt{a_{11}}$$

$$g_{21} = \frac{a_{21}}{g_{11}}$$

$$g_{33} = \frac{a_{31}}{g_{11}}$$

$$g_{22} = \sqrt{a_{22} - g_{21}^2}$$

$$g_{32} = \frac{1}{g_{22}}(a_{32} - g_{33}g_{23})$$

$$g_{33} = \sqrt{a_{33} - g_{33}^2 - g_{32}^2}.$$

$$g_{ij} = \sqrt{a_{ij} - \sum_{k=1}^{j-1} g_{jk}^2}$$

-continued $$g_{ij} = \frac{1}{g_{ij}}\left(a_{ij} - \sum_{k=1}^{j-1} g_{ik}g_{jk}\right), \quad i = j+1, j+2, \ldots, n$$

Apart from the above examples, some conditions need special handling. For example, if some conditions result in that the linear equations cannot be solved, default values can be used to fill the chroma prediction values. The default values can be predefined or signaled or switched in SPS/APS/PPS/PH/SH/Region/CTU/CU/Subblock/Sample levels, for example, when predefined 1<< (bitDepth-1), or meanC-meanL (mean chroma/luma values from available, or subset of FLM reconstructed neighboring region).

The following examples represent situations when the matrix A cannot be solved, where default prediction values may be assigned to the whole current block:

1. Solving by closed form (analytic, adjugate matrix), but A is singular, (i.e., detA=0);
2. Solving by Cholesky decomposition, but A cannot be Cholesky decomposed, $g_{ij}$<REG_SQR, where REG_SQR is one small value, can be predefined or signaled or switched in SPS/APS/PPS/PH/SH/Region/CTU/CU/Subblock/Sample levels.

Figure 13:
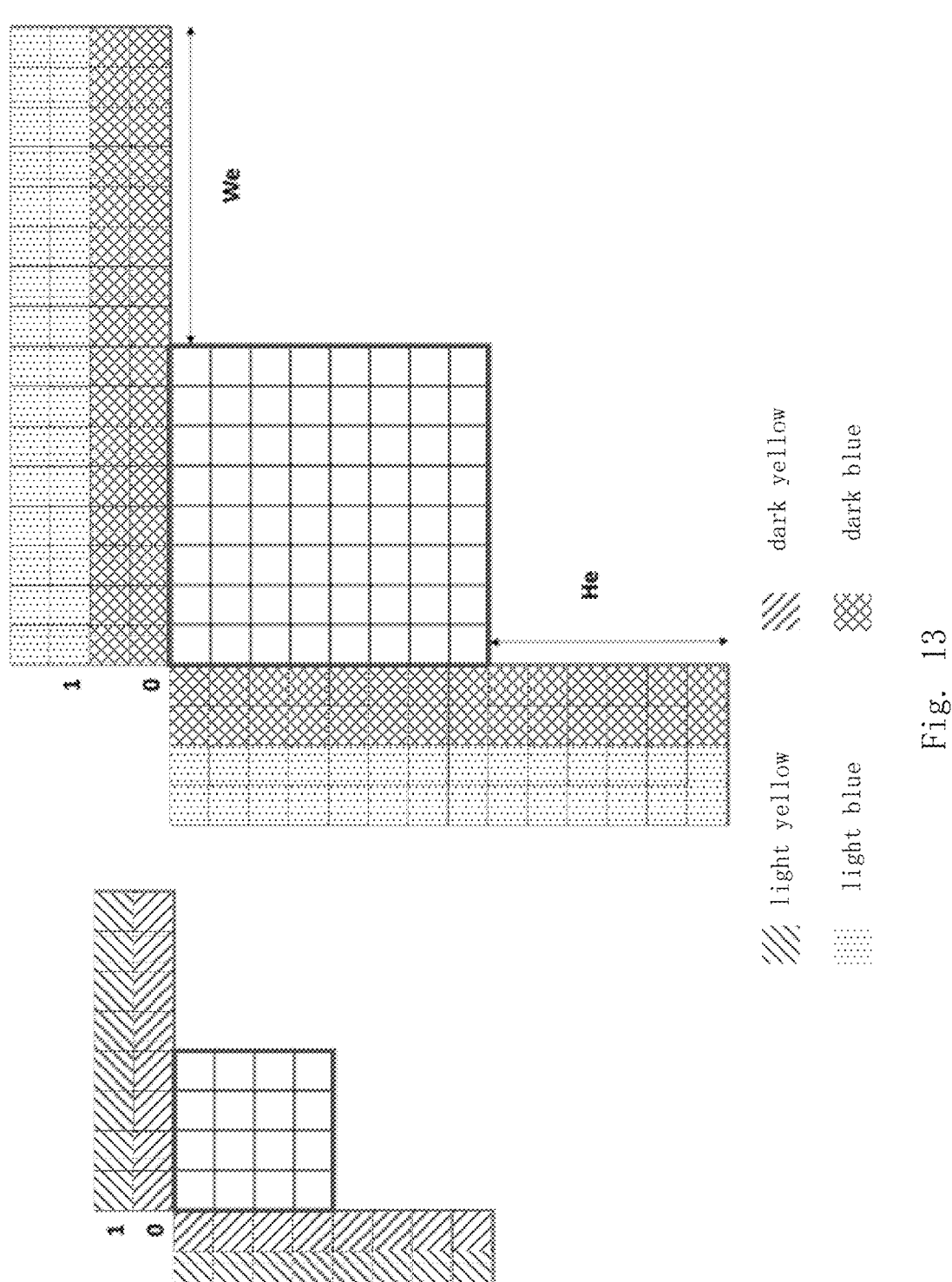
FIG. 13 shows an example in which FLM can use different lines for parameter derivation.

FIG. 10 shows a typical case that the FLM parameters are derived using top 2 and/or left 3 luma lines and top 1 and/or left 1 chroma lines. However, using different region for parameter derivation may bring coding benefit because of different block content and the reconstructive quality of different neighboring samples, as mentioned above. Several ways to choose the applied region for parameter derivation are proposed below:

1. Similar to MDLM, the FLM derivation can only use top or left luma and/or chroma samples to derive the parameters. Whether to use FLM, FLM_L, or FLM_T can be predefined or signaled or switched in SPS/APS/PPS/PH/SH/Region/CTU/CU/Subblock/Sample levels. Suppose that a current chroma block has a size of W×H, then W' and H' are obtained as follows:
   W'=W, H'=H when FLM mode is applied;
   W'=W+We when FLM_T mode is applied; where We denotes extended top luma/chroma samples;
   H'=H+He when FLM_L mode is applied; where He denotes extended left luma/chroma samples.
   The number of extended luma/chroma samples (We, He) can be predefined, or signaled or switched in SPS/APS/PPS/PH/SH/Region/CTU/CU/Subblock/Sample levels.
   For example, predefine (We, He)=(H, W) as the VVC CCLM, or (W, H) as the ECM CCLM. The unavailable (We, He) luma/chroma samples can be repetitive padded from the nearest (horizontal, vertical) luma/chroma samples.
   FIG. 12 shows an illustration of FLM_L and FLM_T (e.g., under 4 tap). When FLM_L or FLM_T is applied, only H' or W' luma/chroma samples are used for parameter derivation, respectively.
2. Similar to MRL, different line index can be predefined, or signaled or switched in SPS/APS/PPS/PH/SH/Region/CTU/CU/Subblock/Sample levels, to indicate the selected luma and/or chroma sample pair line. This may benefit from different reconstructive quality of different line samples.
   FIG. 13 shows that similar to MRL, FLM can use different lines for parameter derivation (e.g., under 4 tap). For example, FLM can use light blue/yellow luma and/or chroma samples in index 1.

3. Extend CCLM region and take full top N and/or left M lines for parameter derivation. FIG. 13 shows all dark and light blue and yellow region can be used at one time. Training using larger region (data) may lead to a more robust MLR model.

FIG. 20 illustrates a workflow of a method 2000 for decoding video data according to one or more aspects of the present disclosure.

At step 2010, a video block and region information may be obtained from a bitstream, wherein the region information comprises an index indicating a region selected from a set of regions located external to the video block for deriving a multiple linear regression (MLR) model. For example, the set of regions may include: a) one or more lines above the video block; b) one or more lines left to the video block; and c) one or more lines above the video block and one or more lines left to the video block. The region either has the same width as the video block or is wider than the video block by a first predefined number of samples when the region is one or more lines above the video block. When the region is wider than the video block, the first predefined number is the same as the width or height of the video block, and wherein the first predefined number may be signaled or switched in different coding block levels. On the other hand, the region either has the same height as the video block or is longer than the video block by a second predefined number of samples when the region is one or more lines left to the video block. When the region is longer than the video block, the second predefined number is the same as the width or height of the video block, and wherein the second predefined number may be signaled or switched in different coding block levels. In another embodiment, the region has the same height and width as the video block or a height and a width of the region are twice those of the video block when the region is one or more lines above the video block and one or more lines left to the video block. In still another embodiment, the region is adjacent to the video block or spaced from the video block by one or more lines above and/or left to the video block.

At step 2020, luma and chroma sample values in the region may be obtained based on the region information. In one embodiment, one or more of the luma and chroma sample values in the region is padded, and wherein the padding may be repetitive padding from the nearest samples.

At step 2030, the MLR model may be derived using the luma and chroma sample values in the region. In one embodiment, the MLR model is derived by pseudo inverse matrix calculation, and wherein the pseudo inverse matrix is solved by one of: a) closed-form solution; b) Gauss-Jordan elimination; c) Cholesky decomposition; d) Newton's method; c) Cayley-Hamilton method; and f) Eigendecomposition, and wherein the method further comprising using default values as the predicted chroma sample values when the pseudo inverse matrix can not be solved.

At step 2040, each of the chroma sample values in the video block may be predicted by applying the MLR model to corresponding luma sample values for that chroma sample.

At step 2050, decoded video block may be obtained using the predicted chroma sample values.

FIG. 21 illustrates a workflow of a method 2100 for encoding video data according to one or more aspects of the present disclosure.

At step 2110, a video block may be obtained from a video frame.

At step 2120, luma and chroma sample values in a region may be obtained based on region information, wherein the region information comprises an index indicating the region selected from a set of regions located external to the video block for deriving the MLR model.

At step 2130, a multiple linear regression (MLR) model may be derived using the luma and chroma sample values in the region. For example, the set of regions may include: a) one or more lines above the video block; b) one or more lines left to the video block; and c) one or more lines above the video block and one or more lines left to the video block. The region either has the same width as the video block or is wider than the video block by a first predefined number of samples when the region is one or more lines above the video block. When the region is wider than the video block, the first predefined number is the same as the width or height of the video block, and wherein the first predefined number may be signaled or switched in different coding block levels. On the other hand, the region either has the same height as the video block or is longer than the video block by a second predefined number of samples when the region is one or more lines left to the video block. When the region is longer than the video block, the second predefined number is the the method further comprising using default values as the predicted chroma sample values when the pseudo inverse matrix can not be solved.

At step 2140, each of the chroma sample values in the video block may be predicted by applying the MLR model to corresponding luma sample values for that chroma sample. In one embodiment, one or more of the luma and chroma sample values in the region is padded, and wherein the padding may be repetitive padding from the nearest samples.

At step 2150, a bitstream comprising encoded video block may be obtained using the predicted chroma sample values and the region information.

Corresponding syntax may be defined as below for the FLM prediction.

FLC: fixed length code

TU: truncated unary code

EGk: exponential-golomb code with order k, where k can be fixed or signaled/switched in SPS/APS/PPS/PH/SH/Region/CTU/CU/Subblock/Sample levels.

SVLC: signed EG0

UVLC: unsigned EG0

| Level | Syntax element | Binarization | Meaning |
|---|---|---|---|
| SPS | flm_enabled_flag | FLC | whether FLM is enabled in the sequence, can be inferred off when chromaFormat == CHROMA_400, or CCLM is off |
| PH/SH | ph_flm_cb_flag ph_flm_cr_flag | FLC | whether FLM is enabled in this picture/slice for Cb/Cr, can be inferred off when chromaFormat == CHROMA_400, or CCLM is off |
| PH/SH | ph_flm_cb_ctb_control_flag ph_flm_cr_ctb_control_flag | FLC | whether to enable Cb/Cr on/off control at CTB level |
| CTU | ctb_flm_cb_flag ctb_flm_cr_flag | CABAC | whether FLM is enabled for the current Cb or Cr CTB, can be CABAC bypass coded or with N contexts (2: up/left, or N neighboring CTBs) |
| CU | cu_flm_cb_flag cu_flm_cr_flag | CABAC, TU | whether FLM is enabled for the current Cb or Cr CU, can be CABAC bypass coded or with N contexts (2: up/left, or N neighboring CUs) |
| CU | flm_cb_filter_idx flm_cr_filter_idx | CABAC, TU | which filter shape idx (in the predefined set) is used for the CU, can be CABAC bypass coded or with N contexts (2: up/left, or N neighboring CUs) |
| CU | flm_cb_mdlm_idx flm_cr_mdlm_idx | CABAC, TU | which MDLM idx (FLM, FLM_L, FLM_T) is used for the CU, can be CABAC bypass coded or with N contexts (2: up/left, or N neighboring CUs) |
| CU | flm_cb_mrl_idx flm_cr_mrl_idx | CABAC, TU | which FLM MRL idx (e.g., 0, 1) is used for the CU, can be CABAC bypass coded or with N contexts (2: up/left, or N neighboring CUs) | same as the width or height of the video block, and wherein the second predefined number may be signaled or switched in different coding block levels. In another embodiment, the region has the same height and width as the video block or a height and a width of the region are twice those of the video block when the region is one or more lines above the video block and one or more lines left to the video block. In still another embodiment, the region is adjacent to the video block or spaced from the video block by one or more lines above and/or left to the video block. In one embodiment, the MLR model is derived by pseudo inverse matrix calculation, and wherein the pseudo inverse matrix is solved by one of: a) closed-form solution; b) Gauss-Jordan elimination; c) Cholesky decomposition; d) Newton's method; e) Cayley-Hamilton method; and f) Eigendecomposition, and wherein Note that the binarization of each syntax element can be changed.

Figure 22:
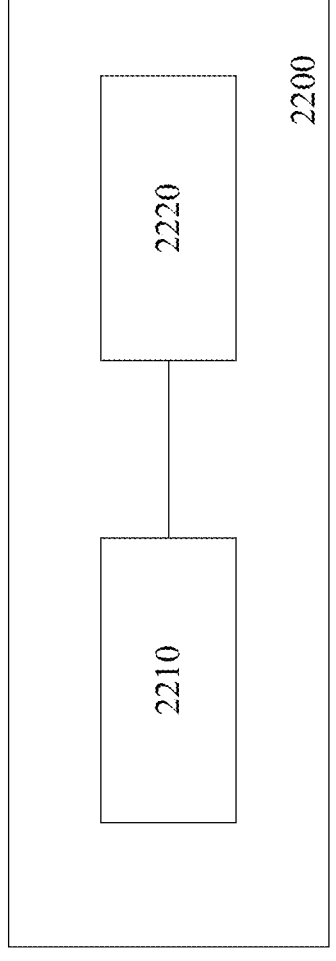
FIG. 22 illustrates an exemplary computing system according to one or more aspects of the present disclosure.

FIG. 22 illustrates an exemplary computing system 2200 according to one or more aspects of the present disclosure. The computing system 2200 may comprise at least one processor 2210. The computing system 2200 may further comprise at least one storage device 2220. The storage device 2220 may store computer-executable instructions that, when executed, cause the processor 2210 to perform the steps of methods described above. The processor 2210 may be a general-purpose processor, or may also be implemented as a combination of computing devices, e.g., a combination of a DSP and a microprocessor, multiple microprocessors, one or more microprocessors in conjunction with a DSP core, or any other such configuration. The storage device 2220 may store the input data, output data, data generated by processor 2210, and/or instructions executed by processor 2210.

It should be appreciated that the storage device 2220 may store computer-executable instructions that, when executed, cause the processor 2210 to perform any operations according to the embodiments of the present disclosure.

The embodiments of the present disclosure may be embodied in a computer-readable medium such as non-transitory computer-readable medium. The non-transitory computer-readable medium may comprise instructions that, when executed, cause one or more processors to perform any operations according to the embodiments of the present disclosure. For example, the instructions, when executed, may cause one or more processors to receive a bitstream and perform the decoding operations as described above. For another example, the instructions, when executed, may cause one or more processors to perform the encoding operations and transmit a bitstream comprising the encoded video information associated with the predicted chroma sample as described above.

The following provides an overview of some aspects of the present disclosure.

Aspect 1: A method for decoding video data, comprising: obtaining, from a bitstream, a video block and region information, wherein the region information comprises an index indicating a region selected from a set of regions located external to the video block for deriving a multiple linear regression (MLR) model; obtaining luma and chroma sample values in the region based on the region information; deriving the MLR model using the luma and chroma sample values in the region; predicting each of the chroma sample values in the video block by applying the MLR model to corresponding luma sample values for that chroma sample; and obtaining decoded video block using the predicted chroma sample values.

Aspect 2. The method of aspect 1, wherein the set of regions includes: a) one or more lines above the video block; b) one or more lines left to the video block; and c) one or more lines above the video block and one or more lines left to the video block.

Aspect 3. The method of aspect 2, wherein the region either has the same width as the video block or is wider than the video block by a first predefined number of samples when the region is one or more lines above the video block.

Aspect 4. The method of aspect 3, wherein the first predefined number is the same as the width or height of the video block, and wherein the first predefined number is signaled or switched in different coding block levels.

Aspect 5. The method of aspect 2, wherein the region either has the same height as the video block or is longer than the video block by a second predefined number of samples when the region is one or more lines left to the video block.

Aspect 6. The method of aspect 5, wherein the second predefined number is the same as the width or height of the video block, and wherein the second predefined number is signaled or switched in different coding block levels.

Aspect 7. The method of aspect 2, wherein the region has the same height and width as the video block or a height and a width of the region are twice those of the video block when the region is one or more lines above the video block and one or more lines left to the video block.

Aspect 8. The method of aspect 1, wherein the region is adjacent to the video block or spaced from the video block by one or more lines above and/or left to the video block.

Aspect 9. The method of aspect 1, wherein one or more of the luma and chroma sample values in the region is padded, and wherein the padding is a repetitive padding from the nearest samples.

Aspect 10. The method of aspect 1, wherein the MLR model is derived by pseudo inverse matrix calculation, and wherein the pseudo inverse matrix is solved by one of: a) closed-form solution; b) Gauss-Jordan elimination; c) Cholesky decomposition; d) Newton's method; e) Cayley-Hamilton method; and f) Eigendecomposition, and wherein the method further comprising using default values as the predicted chroma sample values when the pseudo inverse matrix can not be solved.

Aspect 11. A method for encoding video data, comprising: obtaining a video block from a video frame; obtaining luma and chroma sample values in a region based on region information, wherein the region information comprises an index indicating the region selected from a set of regions located external to the video block for deriving a multiple linear regression (MLR) model; deriving the MLR model using the luma and chroma sample values in the region; predicting each of the chroma sample values in the video block by applying the MLR model to corresponding luma sample values for that chroma sample; and obtaining a bitstream comprising encoded video block using the predicted chroma sample values and the region information.

Aspect 12. The method of aspect 11, wherein the set of regions includes: a) one or more lines above the video block; b) one or more lines left to the video block; and c) one or more lines above the video block and one or more lines left to the video block.

Aspect 13. The method of aspect 12, wherein the region either has the same width as the video block or is wider than the video block by a first predefined number of samples when the region is one or more lines above the video block.

Aspect 14. The method of aspect 13, wherein the first predefined number is the same as the width or height of the video block, and wherein the first predefined number is signaled or switched in different coding block levels.

Aspect 15. The method of aspect 12, wherein the region either has the same height as the video block or is longer than the video block by a second predefined number of samples when the region is one or more lines left to the video block.

Aspect 16. The method of aspect 15, wherein the second predefined number is the same as the width or height of the video block, and wherein the second predefined number is signaled or switched in different coding block levels.

Aspect 17. The method of aspect 12, wherein the region has the same height and width as the video block or a height and a width of the region are twice those of the video block when the region is one or more lines above the video block and one or more lines left to the video block.

Aspect 18. The method of aspect 11, wherein the region is adjacent to the video block or spaced from the video block by one or more lines above and/or left to the video block.

Aspect 19. The method of aspect 11, wherein one or more of the luma and chroma sample values in the region is padded, and wherein the padding is a repetitive padding from the nearest samples.

Aspect 20. The method of aspect 11, wherein the MLR model is derived by pseudo inverse matrix calculation, and wherein the pseudo inverse matrix is solved by one of: a) closed-form solution; b) Gauss-Jordan elimination; c) Cholesky decomposition; d) Newton's method; c) Cayley-Hamilton method; and f) Eigendecomposition, and wherein the method further comprising using default values as the predicted chroma sample values when the pseudo inverse matrix can not be solved.

Aspect 21. A computer system, comprising: one or more processors; and one or more storage devices storing computer-executable instructions that, when executed, cause the one or more processors to perform the operations of the method of any one of aspects 1-20.

Aspect 22. A computer program product, storing computer-executable instructions that, when executed, cause one or more processors to perform the operations of the method of any one of aspects 1-20.

Aspect 23. A computer readable medium, storing computer-executable instructions that, when executed, cause one or more processors to receive a bitstream and perform the operations of the method of one of aspects 1-10 based on the bitstream.

Aspect 24. A computer readable medium, storing computer-executable instructions that, when executed, cause one or more processors to perform the operations of the method of one of aspects 11-20 and transmit a bitstream comprising encoded video information associated with the predicted chroma samples.

It should be appreciated that all the operations in the methods described above are merely exemplary, and the present disclosure is not limited to any operations in the methods or sequence orders of these operations, and should cover all other equivalents under the same or similar concepts.

It should also be appreciated that all the modules in the methods described above may be implemented in various approaches. These modules may be implemented as hardware, software, or a combination thereof. Moreover, any of these modules may be further functionally divided into sub-modules or combined together.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skill in the art are expressly incorporated herein by reference and are intended to be encompassed by the claims.

What is claimed is:

1. A method for decoding video data, comprising:
obtaining, from a bitstream, region information, wherein the region information comprises an index indicating a region selected from a set of regions located external to a video block for deriving a multiple linear regression (MLR) model;
obtaining luma and chroma sample values in the region based on the region information;
deriving the MLR model using the luma and chroma sample values in the region; and
predicting each of the chroma sample values in the video block by applying the MLR model to corresponding luma sample values for that chroma sample.

2. The method of claim 1, wherein the set of regions includes: a) one or more lines above the video block; b) one or more lines left to the video block; and c) one or more lines above the video block and one or more lines left to the video block.

3. The method of claim 2, wherein the region either has the same width as the video block or is wider than the video block by a first predefined number of samples when the region is one or more lines above the video block; or
wherein the first predefined number is the same as the width or height of the video block, and wherein the first predefined number is signaled or switched in different coding block levels.

4. The method of claim 2, wherein the region either has the same height as the video block or is longer than the video block by a second predefined number of samples when the region is one or more lines left to the video block; or
wherein the second predefined number is the same as width or height of the video block, and wherein the second predefined number is signaled or switched in different coding block levels.

5. The method of claim 2, wherein the region has the same height and width as the video block or a height and a width of the region are twice those of the video block when the region is one or more lines above the video block and one or more lines left to the video block.

6. The method of claim 1, wherein the region is adjacent to the video block or spaced from the video block by one or more lines above and/or left to the video block.

7. The method of claim 1, wherein one or more of the luma and chroma sample values in the region is padded, and wherein the padding is a repetitive padding from the nearest samples.

8. The method of claim 1, wherein the MLR model is derived by pseudo inverse matrix calculation, and wherein the pseudo inverse matrix is solved by one of: a) closed-form solution; b) Gauss-Jordan elimination; c) Cholesky decomposition; d) Newton's method; e) Cayley-Hamilton method; and f) Eigendecomposition, and wherein the method further comprising using default values as the predicted chroma sample values when the pseudo inverse matrix can not be solved.

9. The method of claim 1, wherein the video block is encoded in a 4:4:4 chroma format.

10. A computer system, comprising:
one or more processors; and
one or more storage devices storing computer-executable instructions that, when executed, cause the one or more processors to perform the method of claim 1.

11. The computer system of claim 10, wherein the set of regions includes: a) one or more lines above the video block; b) one or more lines left to the video block; and c) one or more lines above the video block and one or more lines left to the video block.

12. The computer system of claim 11, wherein the region either has the same width as the video block or is wider than the video block by a first predefined number of samples when the region is one or more lines above the video block; or
wherein the first predefined number is the same as the width or height of the video block, and wherein the first predefined number is signaled or switched in different coding block levels.

13. The computer system of claim 11, wherein the region either has the same height as the video block or is longer than the video block by a second predefined number of samples when the region is one or more lines left to the video block; or
wherein the second predefined number is the same as a width or height of the video block, and wherein the second predefined number is signaled or switched in different coding block levels.

14. The computer system of claim 11, wherein the region has the same height and width as the video block or a height and a width of the region are twice those of the video block when the region is one or more lines above the video block and one or more lines left to the video block.

15. The computer system of claim 10, wherein the region is adjacent to the video block or spaced from the video block by one or more lines above and/or left to the video block.

16. The computer system of claim 10, wherein one or more of the luma and chroma sample values in the region is padded, and wherein the padding is a repetitive padding from the nearest samples; or wherein the MLR model is derived by pseudo inverse matrix calculation, and wherein the pseudo inverse matrix is solved by one of: a) closed-form solution; b) Gauss-Jordan elimination; c) Cholesky decomposition; d) Newton's method; e) Cayley-Hamilton method; and f) Eigendecomposition, and wherein the method further comprising using default values as the predicted chroma sample values when the pseudo inverse matrix can not be solved.

17. The computer system of claim 10, wherein the video block is encoded in a 4:4:4 chroma format.

18. A non-transitory computer readable storage medium storing a bitstream and instructions, wherein the instructions, which when executed by a computing device having one or more processors, cause the one or more processors to perform an encoding method to generate the bitstream, the method comprising:

obtaining luma and chroma sample values in a region based on region information, wherein the region information comprises an index indicating the region selected from a set of regions located external to a video block for deriving a multiple linear regression (MLR) model;

deriving the MLR model using the luma and chroma sample values in the region;

predicting each of the chroma sample values in the video block by applying the MLR model to corresponding luma sample values for that chroma sample; and obtaining a bitstream comprising encoded video block using the predicted chroma sample values and the region information, wherein the bitstream is to be decoded by the decoding method according to claim 1.

19. A method for storing a bitstream, comprising:

performing the following steps of an encoding method to generate a bitstream:

obtaining luma and chroma sample values in a region based on region information, wherein the region information comprises an index indicating the region selected from a set of regions located external to a video block for deriving a multiple linear regression (MLR) model;

deriving the MLR model using the luma and chroma sample values in the region;

predicting each of the chroma sample values in the video block by applying the MLR model to corresponding luma sample values for that chroma sample; and obtaining a bitstream comprising encoded video block using the predicted chroma sample values and the region information; and storing the bitstream, wherein the bitstream is to be decoded by the decoding method according to claim 1.

20. The method of claim 19, wherein the video block is encoded in a 4:4:4 chroma format.

\* \* \* \* \*